United States Patent
Kulas

(10) Patent No.: US 9,744,603 B1
(45) Date of Patent: Aug. 29, 2017

(54) TRIGONOMETRIC UNIVERSAL CENTERING JIG ASSEMBLY

(71) Applicant: JPW Industries, Inc., La Vergne, TN (US)

(72) Inventor: Timothy James Kulas, Verona, WI (US)

(73) Assignee: JPW Industries Inc., La Vergne, TN (US)

( * ) Notice: Subject to any disclaimer, the term of this patent is extended or adjusted under 35 U.S.C. 154(b) by 593 days.

(21) Appl. No.: 14/060,647

(22) Filed: Oct. 23, 2013

Related U.S. Application Data

(63) Continuation of application No. 12/840,085, filed on Jul. 20, 2010, now Pat. No. 8,584,563.

(51) Int. Cl.
*B26D 7/06* (2006.01)
*B23B 47/28* (2006.01)
*B23D 47/04* (2006.01)
*B27B 27/02* (2006.01)

(52) U.S. Cl.
CPC ............ *B23B 47/28* (2013.01); *B23D 47/045* (2013.01); *B27B 27/02* (2013.01); *Y10T 83/6614* (2015.04)

(58) Field of Classification Search
CPC ......... B27B 25/08; B27B 25/10; B27B 27/02; Y10T 83/6608; B23B 47/28; B23D 47/025
USPC .......... 83/444, 46, 477.24; 33/630, 633, 640
See application file for complete search history.

(56) References Cited

U.S. PATENT DOCUMENTS

| | | | | |
|---|---|---|---|---|
| 202,668 A | * | 4/1878 | Schleicher | B23D 49/007 144/250.18 |
| 222,574 A | * | 12/1879 | Constant | B27B 27/02 83/438 |
| 287,124 A | * | 10/1883 | Hamlet | B27B 27/02 83/438 |
| 326,454 A | * | 9/1885 | Rawlings | B27B 27/02 83/438 |
| 901,699 A | * | 10/1908 | Fetzer | B27B 25/10 83/435.12 |
| 904,342 A | * | 11/1908 | Loehr | B27B 27/02 83/438 |
| 3,171,454 A | * | 3/1965 | Boice | B27C 1/02 144/129 |

(Continued)

FOREIGN PATENT DOCUMENTS

DE 3831378 A1 * 3/1990 ............. B27B 27/02

*Primary Examiner* — Kenneth E Peterson
*Assistant Examiner* — Samuel A Davies
(74) *Attorney, Agent, or Firm* — Schiff Hardin LLP

(57) ABSTRACT

For use upon machinery in a wood shop or any industrial facility where it is desired to operate upon an object's unmarked centerline, such as with a powered saw table, drill press or any other apparatus required for the task: The sine and cosine of a triangle—are used to assure that as a certain component is moved a given distance, a guide fence is moved transversely just a fraction of that distance—preferably one-half—away from or toward the task performing instrument—a saw blade, drill bit or other operable tool. Thus, if the distance moved by the component equals the width of the piece to be worked upon, where the trigonometric sine is such that the guide fence is moved half that distance, given certain further adjustment, the task performing instrument is caused to operate precisely upon the piece's centerline, represented by one-half its width.

4 Claims, 23 Drawing Sheets

(56) References Cited

U.S. PATENT DOCUMENTS

| | | | |
|---|---|---|---|
| 4,593,590 A * | 6/1986 | Gray | B27B 27/10 |
| | | | 83/435.2 |
| 4,651,606 A | 3/1987 | Hurwitz | |
| 5,016,508 A | 5/1991 | Hallenbeck | |
| 5,165,458 A | 11/1992 | Hirsch | |
| 5,425,405 A * | 6/1995 | Brodsky | B27C 5/04 |
| | | | 144/253.1 |
| 5,492,160 A | 2/1996 | McCracken | |
| 5,598,878 A | 2/1997 | Wirth et al. | |
| D481,402 S | 10/2003 | Jenkins et al. | |
| 6,959,632 B2 * | 11/2005 | Lee | B27B 27/06 |
| | | | 125/13.01 |
| 7,266,800 B2 | 9/2007 | Sezginer | |
| 7,735,403 B2 | 6/2010 | Oberheim et al. | |
| 2003/0150309 A1 * | 8/2003 | Goodwin | B27B 27/02 |
| | | | 83/435.12 |

* cited by examiner

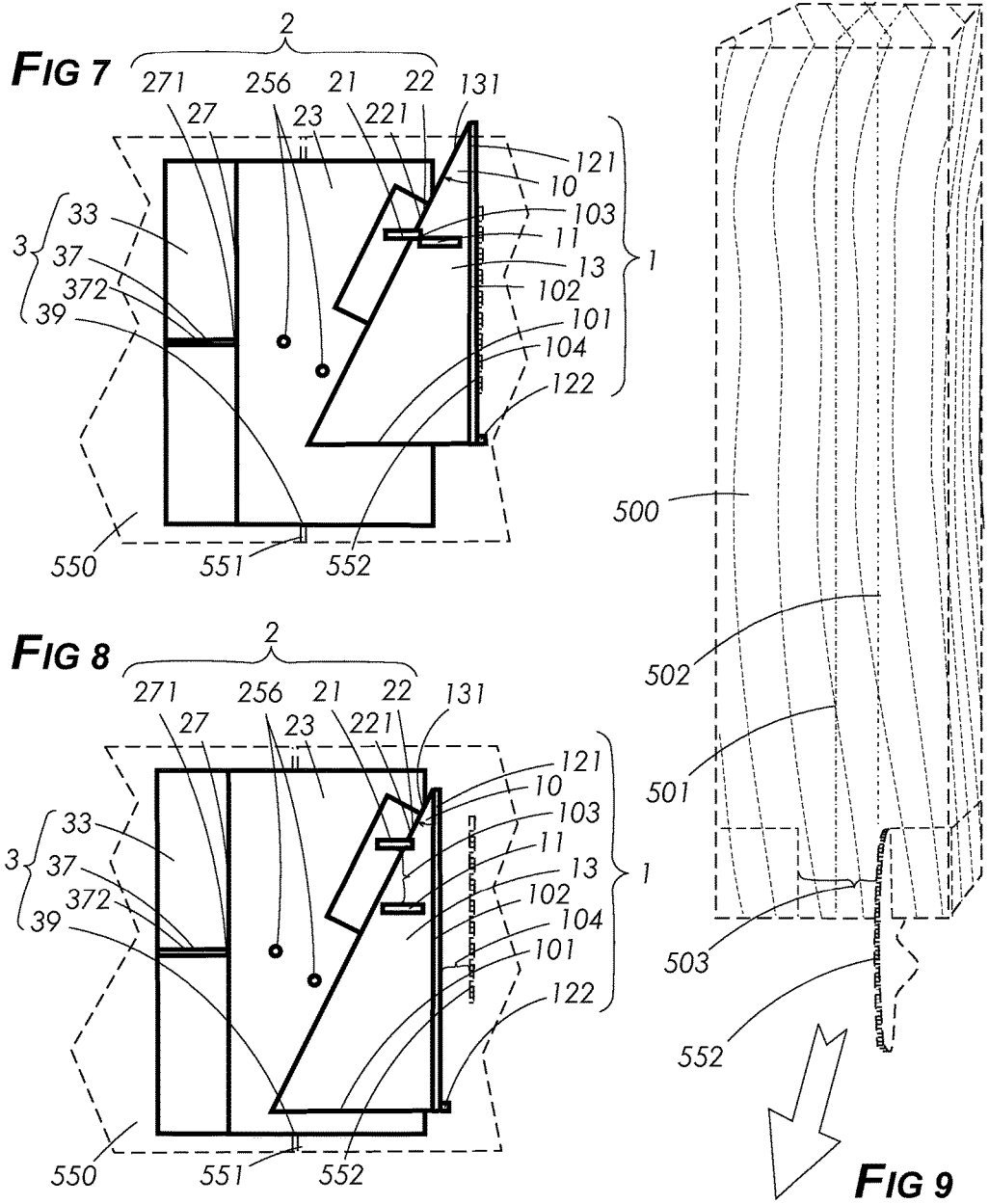

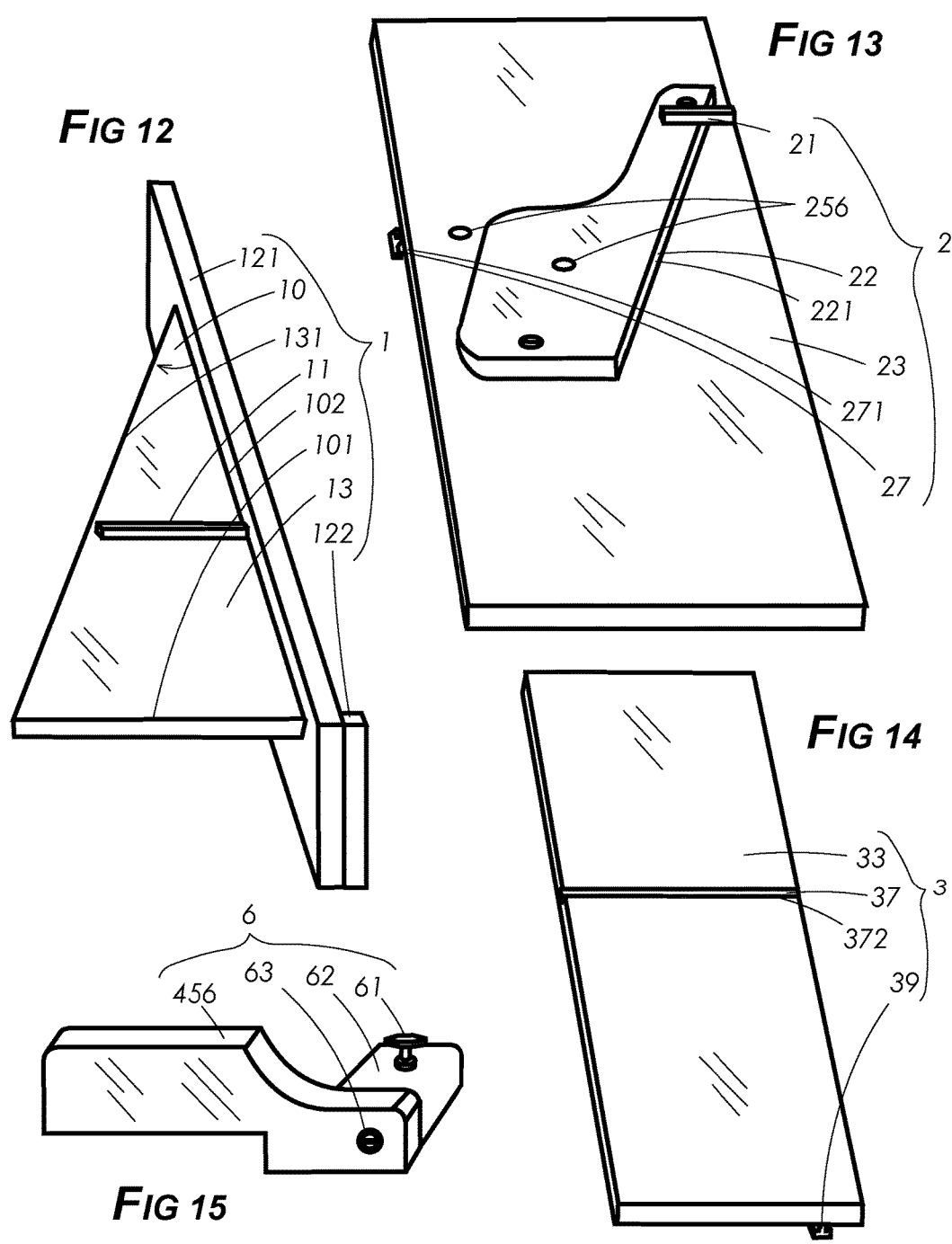

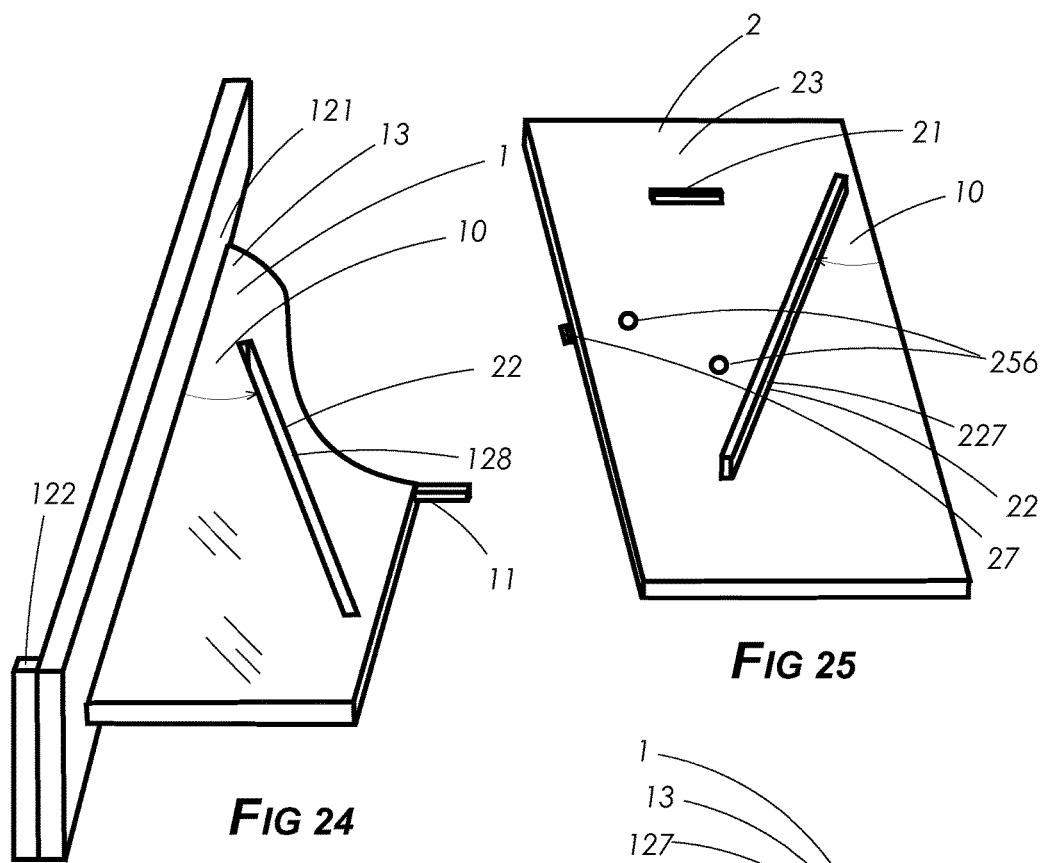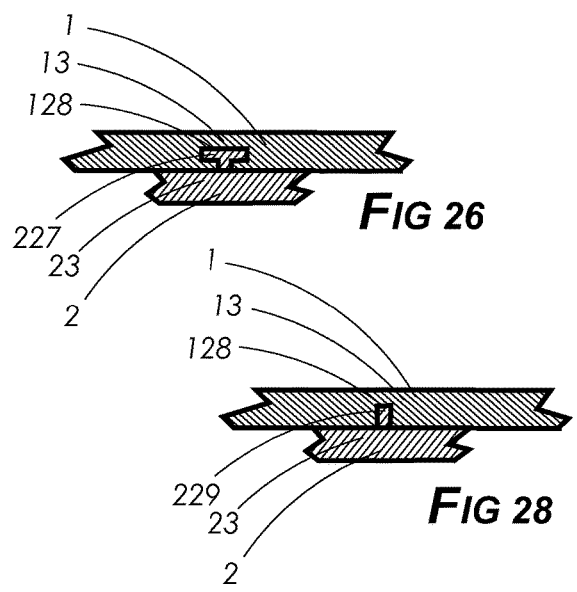

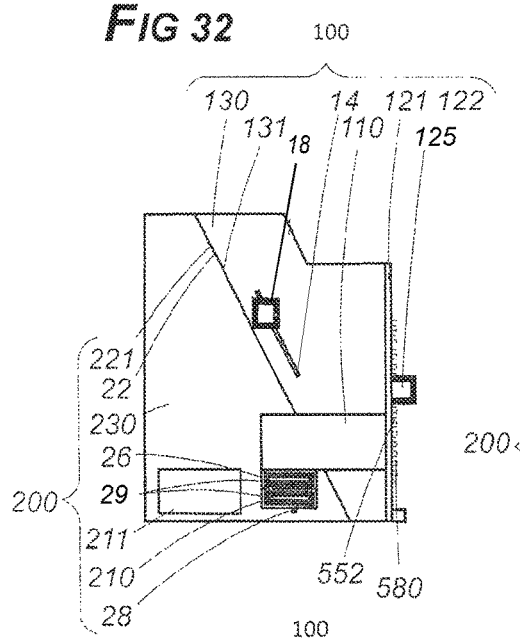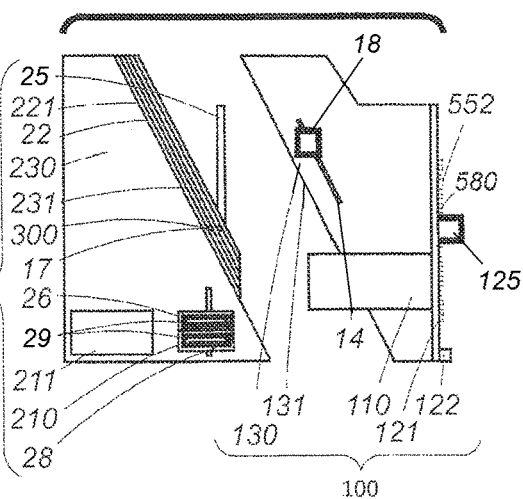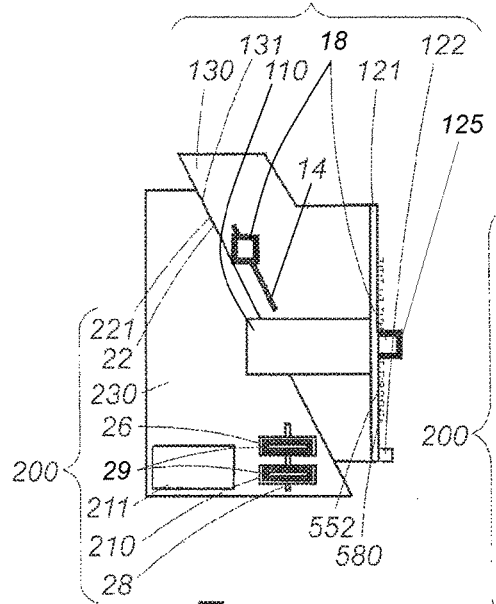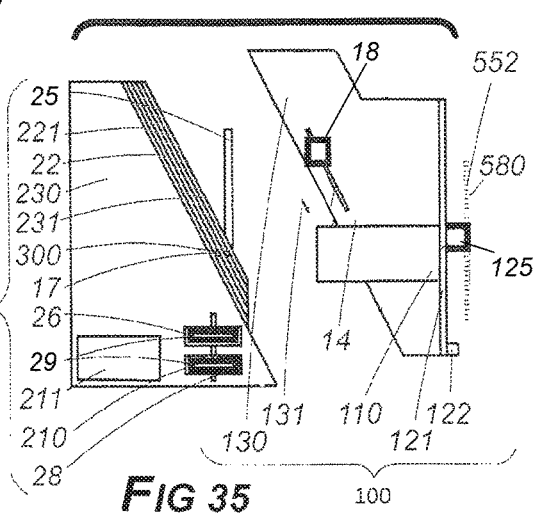

TRIGONOMETRIC UNIVERSAL CENTERING JIG ASSEMBLY

CROSS REFERENCE TO RELATED APPLICATION

The subject matter hereof comprises a Continuation-in-Part (CIP) of non-provisional utility application Ser. No. 12/840,085, filed Jul. 20, 2010 entitled "Trigonometric Saw-Cut Centering Jig Assembly".

BACKGROUND OF THE INVENTION

Field of the Invention
Industrial and workshop centering devices
Description of the Related Art Occasionally a descriptive term in this application may be shortened so as to recite only a part rather than the entirety thereof as a matter of convenience or to avoid needless redundancy. In instances in which that is done, applicant intends that the same meaning be afforded each manner of expression. Thus, the term vertically pivotable spacer (61) might be used in one instance but in another, if meaning is otherwise clear from context, expression might be shortened to pivotable spacer (61) or merely spacer (61). Any of those forms is intended to convey the same meaning.

The term attach or fasten or any of their forms when so used means that the juncture is of a more or less permanent nature, such as might be accomplished by nails, screws, welds or adhesives. Thus it is stated herein that the assembly's moveable curb (11) is attached to the surface of the moveable component's plate-like body (13). Employment of the words connector join or any of their forms is intended to include the meaning of any of those terms in a more general way. The term emplace describes a relationship between two objects in which one is merely positioned upon or within the other from which it may be readily removed. Thus, it is explained that the workable piece (500) is emplaced between the moveable and fixed curbs (11 and 21, respectively) for measuring adjustment purposes. The term rigid attachment denotes a connection in which the juncture between assembly parts permits removal only with some degree of difficulty. Such is described as the interconnection of the displacement accommodating component's longitudinal translation rail (99) with the saw table's longitudinal translation channel (551).

The word comprise may be construed in any one of three ways herein. A term used to describe a given object is said to comprise it, thereby characterizing it with what could be considered two-way equivalency in meaning. Thus, it is stated that the distance the moveable component (1) is advanced or withdrawn parallel the saw blade's (552) cutting plane manifests a longitudinally disposed vector comprising the first side of a triangle, meaning that the latter is in fact the former and the former, the latter. The term comprise may also be characterized by what might be considered one-way equivalency, as when it is stated herein that any one of several forms—an angled abutment ridge (221), for example—may comprise the assembly's angle determinant means (22). This use of the word has a generic sense to it. That is, an angled abutment ridge (221) will always be the angle determinant means (22) but the angle determinant means (22) may be an angled abutment ridge (221) in one case but something else—an angled rail and channel assembly (222), for instance—in another. However, the word comprise may also be used to describe a feature which is part of the structure or composition of a given object. Thus, it is said the fixed component (2) comprises lateral translation means (27) to laterally position the fixed component (2) upon the displacement accommodating component (3). The meaning in the respective cases is clear from context, however. Accordingly, modifying words to clarify which of the three uses is the intended one seem unnecessary.

Terms relating to physical orientation such as upper, upon, upward, downward, overlying or underlying, refer to the positioning of an object in the manner in which it would be typically oriented for use or viewing. Thus, the terms distal, with reference to an interior angle of a triangle, and proximal, for the locus of another interior angle, with reference to the guide fence (121) it is near, are positions observed from the perspective of the powered table saw operator. Similarly, the disposition of the vertical centerline (501) of a workable piece (500) refers to its (501) orientation as it (501) approaches the saw blade (552) for cutting. Advancement and withdrawal of the moveable component (1) parallel the saw blade's (552) cutting plane presuppose that the blade (552) of a table saw rotates in a particular plane and designates movement in a longitudinal direction, while movement transverse to that is described as lateral, bearing in a direction at right angles to the longitudinal. The width of the workable piece (500) is a selected dimension thereof, identifying the face thereof (500) which is being cut into by the saw blade (552). These terms of orientation should be interpreted to represent respective aspects or dispositions of members of the assembly in a consistent manner—even if it were, for example, considered positioned upside down in certain instances.

The term mated, with reference to various rail (39, 64, 99, 127, 227, 871 and 971) and channel (65, 128, 228, 551, 872 and 972) arrangements denote a fitted co-relationship, permitting one to slide freely along with reference to the other each remaining secure in its interconnection with the other. Rail (39, 64, 99, 127, 227, 871 and 971) and channel (65, 128, 228, 551, 872 and 972) pairs suggest translation systems permitting such free unrestricted movement in a given direction, the word translation referring to the repositioning of an object from one place to another.

The term angularly and related expressions sharing the same word root indicates extension in other than a transverse manner with reference to its base of origin. The term right triangularly configured describes a particular triangle wherein two sides are transverse one another comprising an angle between them as a right angle. A triangle may be considered in an abstract sense comprising sides which though not physically observable or present, may be said to manifest vectors of directional force or movements. This abstract visualization, quite common in fields of science such as physics, is useful in understanding either the way in which a given force or movement may be analyzed in terms of the combined or net effect of two individual components disposed or may be said to be manifested at an angle to one another; or conversely, the manner in which the two angularly disposed individual components may be considered in terms of their combined or net effect.

While the inventive assembly hereof is considered in terms of cutting operation upon a workable piece (500), there are other materials within which a mortise and tenon (503) might be formed. The term "workable object" (556) is, therefore, used herein to address that fact. While a mortise may be prepared by various alternative means-often with a cutting tool known as a router, it has become a common practice to carve one out by means of a drill-bit-chisel, a devise operated upon a drill press (554). The drill-bit-chisel comprises a drill-bit (555) housed within a durable framework of cutting chisel-like edges and is loaded upon the drill press (554) in the usual manner of doing so for any drill bit (555) intended for use. By operation of the drill press (554), this devise is caused to move in the intended manner to cut out the mortise. The width of the mortise, thus, may properly be considered to equal that of the drill-bit-chisel devise.

In using a table saw, for reasons of safety and convenience, a left-handed operator takes a position different from that of a right-handed operator. The right-handed operator positions himself or herself to the left of the saw blade (552) with the guide fence (121) intermediately disposed, using his or her right hand to push the workable material (500) through for cutting. Work assemblies or jigs of various sorts are emplaced with a rail seated for longitudinal running along one of the saw table's longitudinal translation—or miter—channels (551). One such channel (551) is disposed to the left of the saw blade (552), the other (551) to the right. The operator selects one (551) or the other (551) for emplacement of the particular apparatus he or she is using, depending upon his or her right-handedness or left-handedness.

The tenon (503) is a tongue-like projection formed to fit the mortise to join—usually transversely—two workable pieces. It comprises two shoulders, one to each side of the tongue-like projection. Consider, for instance three lengths of wood placed adjacent one another to form a unified structure such that the middle one is longer than the other two, sticking out from the ends of the two other pieces. The combination may be considered a tenon and the ends of the shorter pieces, the shoulders of the tenon with the sides of the tongue-like projection extending upwardly from the shoulders to comprise the tenon's cheeks. As a matter of orientation, a view of the workable piece (500) from the side exhibiting what will be cut to form both the tongue-like projection and the shoulders is herein designated the face of the workable piece (500) comprising it. As an incidental matter, of course, the oppositely disposed or reverse side to the piece (500) comprises the same configuration.

The preparation of a tenon (503) to precisely fit the mortise is a well-known challenge in workshop art. One might emplace a workable piece (500) for cutting with its (500) face down upon the saw table (552) to cut the tenon's (503) cheeks, in which case, by reason of the circumferential roundness of the saw blade (552), each cut would leave an untidy over-cutting groove at the end thereof. The same undesirable result would occur upon thereafter cutting the shoulders. Alternatively, one might turn the workable piece (500), holding its (500) length upright so as to emplace the workable piece (500) so that the face is advanced toward the saw blade (552) for cutting. Although a bit more cumbersome in that some degree of skill is required to assure the piece (500) is held straightly upright in running it (500) through the saw blade (552), this technique is preferred by many. By employing it in cutting the tenon's (503) cheeks, the saw blade (552) passes all the way through the workable piece (500), leaving no untidy ends to the cuts. The piece (500) may be emplaced so as to lie flatly on the saw table (550) in cutting the shoulders.

Some tenon (503} mortise arrangements may comprise a mortise cut as a straight-through opening in the workable piece comprising the mortise, in which case the tenon (503) formed to fit it requires a second pair of transversely disposed cheeks. For this construction, the same procedure adopted for the first pair of cheeks is followed in cutting the second.

There are few instances in the prior art relying directly upon trigonometric functions in matters of carpentry or workshop assemblies. Jigs employing trigonometry to more efficiently form an angled miter with a powered table saw have appeared but they have little material bearing upon the matters addressed herein. Exemplary are U.S. Pat. No. 4,651,606 issued to Hurwitz, introducing a miter cutting frame which could be used either top side up or upside down; U.S. Pat. No. 5,016,508 issued to Hallenbeck providing for a framework dedicated to that end which comprised angularly arranged pivotable members; and U.S. Pat. No. 5,165,458 issued to Hirsch addressing an assembly wherein the saw cutting fence could be set at varying angles to the saw cutting plane; U.S. Pat. No. 5,492,160 issued to McCracken provided an assembly which aided the forming of a tenon (503) but merely addressed the function of retaining the workable piece (500) in place during the cutting work put upon it (500). U.S. Pat. No. 5,598,878 issued to Wirth comprised an arrangement employing a template which could be set upon the workable piece (500) to assure it (500) was properly cut. U.S. Pat. No. Des. 481,402 s issued to Jenkins is essentially to the same effect. Those references address enhanced operational cutting itself. Moreover, in those cases, as in numerous others, it was necessary to mark a cutting line with a pencil or other scribing tool, an undertaking which might be made unnecessary with a properly designed assembly. U.S. Pat. No. 7,735,403 issued to Oberheim and the references cited by it employ laser beams to indicate either alignment or a cutting path for the saw blade (552) in which the laser beam is merely substituted for the pre-marked pencil line. None of those appear to have dealt with innovative means to perform what might be considered to be pre-setting measurement independent of the cutting instrument but, nevertheless, indirectly influencing the manner and precision of its operation.

It is true there have been developed pattern processes which do influence operation from an independent site. Such was the case in U.S. Pat. No. 7,266,800 issued to Sezginer addressing a method therefor particularly useful in lithography. However, the procedures adopted therein are extremely complex. What is required is to simplify those means in a realistic way.

While the prior art reflects valid contributions facilitating the operation of tenon (503) cutting, a simplified and convenient solution to accomplishing that objective accurately, quickly and inexpensively yet remains to be addressed.

BACKGROUND SUBJECT MATTER FOR UNIVERSAL APPLICATION

The disclosure from the underlying application upon which this CIP is derived is incorporated by reference as though fully set forth herein and made part hereof. However, in that the previously filed material addressed workshop tenon manufacture, the innovative trigonometric principles upon which that was founded provides the focus of attention herein, comprising a conceptional tool not just for manufacture of a tenon and related works, but for universal application. Thus, wherever the centering of some object is required, be it one of woodcraft or industrial production, the trigonometric protocol so addressed serves as a time saving, economical and accurate tool to employ. It takes little imagination to visualize its use for several pursuits in the workshop besides saw-cut or drill press operation—a lathe or router, perhaps—but a great deal more thought must be given to the centering of industrial pieces such as metal can lids, automobile parts, musical instrument components and such. Once that effort is undertaken, all that need be done is constructing the properly shaped apparatus upon which this new trigonometric application concept can be adopted—a task which will likely flow pragmatically from the press of necessity. Admittedly, the trigonometric axiom that there is a halving resultant derived from selection of the proper sine and cosine was considered in ancient Greece or even before. The crafting of that truism to objects of production, however, seems never to have been fairly considered.

It is appropriate to recite separately what comprises a continuation of the underlying disclosure for the Background of the Invention, Brief Summary of the Invention, Brief Description of the Drawings and Detailed Description of the Invention topics, ante.

SUMMARY OF THE INVENTION

An assembly is constructed to be clamped onto the top of a powered table saw as a tenon (503) forming tool. The assembly has its own guide fence (121) which responds to certain manipulations of the assembly by being moved either toward or away from the saw blade (552). This responsive movement can be understood by considering a right triangular shaped plate-like object (1) having a first side positioned against the guide fence (121), a second side projecting transversely from the guide fence (121) to as to dispose a right angle between them and a hypotenuse joining the two sides to complete the right triangle. One of the interior angles lies adjacent the guide fence (121). Upon manually advancing or withdrawing this plate-like object (1) along a line representing the cutting plane of the saw blade (552), the hypotenuse is caused to slide along in abutment against a fixed object (221). The gradient of the hypotenuse inherently forces the entire plate-like object (1) transversely toward or away from the saw blade (552) as the plate-like object (1) is either advanced or withdrawn.

The hypotenuse may be thought of as the combined resultant of two vectors, the advancement or withdrawal representing a first vector thereof and the lateral displacement as a second one.

Once an optimal position has been reached by the advancement or withdrawal manipulations, the plate-like triangle (1) may be set in place by an appropriate clamp (generally referenced as 451). Then a workable piece (500) may be emplaced snugly against the guide fence (121) and advanced through the saw blade (552) to be cut. An understanding of trigonometry reveals that the distance of advancement or withdrawal represents the cosine related side (102) of the triangle and the displacement toward or away from the saw blade (552) represents the sine related side (101) thereof.

The assembly can be useful as a preliminary measuring device for cutting. It may be preset to cut at the vertical centerline (501) of a workable piece (500) if a protocol of sorts is followed. If one could assure that the cosine related side (102) of a conceived of triangle equaled the width of the workable piece (500)—the face thereof to be cut into—and that the sine related side (101) of the interior angle of the triangle equaled one-half the cosine related side (102) thereof, the vertical centerline (501) of the workable piece's (500) width would be determined.

Measuring curbs-a moveable one (11) and a fixed one (21)—are installed as parts of the assembly. The curbs (11, 21) are moved together in abutment and the guide fence (121) is positioned against the saw blade (552), an undertaking which be considered in colloquial parlance as "zero-ing" the assembly. The curbs (11, 21) are separated to admit the width of the workable piece (500) as a matter of preliminary measurement and width of the workable piece (500) is snugly emplaced between them (11, 12) with the disposition so attained set by appropriate clamps (451). The workable piece (500) is then removed from between the curbs (11, 21) and emplaced snugly against the guide fence (121) to be advanced through the saw blade (552) for cutting. By reason of the one to one-half ratio between the cosine related side (102) of the triangle to the sine related side (101), the blade (552) will cut at the vertical centerline (501}—or, more correctly, will cut at a distance from the guide fence (121) equal to one-half the workable piece's (500) width.

If instead of cutting at the workable piece's centerline (501), it is desired to cut a cheek of a tenon (503), additional concerns must be addressed. A tenon (503) exactly the width of a given mortise may be formed merely be taking into account the mortise's width. Although the width of the mortise may first be measured for that purpose, for one cut by a drill-bit-chisel, supra, of width exactly equal that of the mortise it carves out, the chisel's width may instead be conveniently employed to that end. In that case, the width of the drill-bit-chisel is emplaced between the curbs (11,21) side-by-side the width of the workable piece (500) so that the length of the cosine related side (102) of the triangle considered equals the combined widths of the workable piece (500) and the drill-bit-chisel with the disposition so attained set by appropriate clamps (451). The workable piece (500) is then removed from between the curbs (11,21) and emplaced snugly against the guide fence (121) to be advanced through the saw blade (552) for cutting. Again, by reason of the one to one-half ratio between the cosine related side (102) of the triangle to the sine related side (101), the blade (552) will cut at a predetermined centerline (502}—that represented by the combined widths. This cut constitutes a tenon (503) cheek for the mortise it will be fitted to.

To cut the second cheek of the tenon (500), the workable piece (500) is rotated 180 degrees and advanced through the saw blade (552) for cutting. Upon removing the material outside the cuts—the tenon's (503) shoulders—a tenon (503) of precise width to fit the mortise is formed.

It is feasible to avoid removing the drill-bit-chisel from the drill press it was loaded in and subsequently reloading it therein. As a convenience, a spacer (61) equal in width to the given drill-bit-chisel may be interposed between the curbs (500) for side-by-side emplacement with the workable piece (500). The spacer (61) may comprise means of repositioning (63) to accommodate the widths of non-standard chisels or other mortise carving devices.

The precision by which the tenon (503) forming task is undertaken is made possible by reason of the one to one-half ratio of the cosine related side (102) of the triangle to the sine related side (101) thereof. To accomplish this result, it is necessary the angle determining those values be 26.565 degrees, for which the cosine thereof is 0.894 and the sine is 0.447. Furthermore, the assembly comprises angle determinant means (22) by which, as the moveable component (1) is advanced or withdrawn, this necessary angularity is maintained.

The assembly, then is comprised of a moveable component (1) capable of advancement and withdrawal parallel the saw blade's (552) cutting plane. The moveable component (1) must be supported upon a base plate—more specifically identified herein as a displacement accommodating component (3}—which connects to the saw table (550). Because the saw table (550) comprises a longitudinal translation channel (551)—sometimes referred to as a miter channel—it is convenient to fasten the base plate to the saw table (550) by a longitudinal translation rail (39) mated to the saw table's channel (551). This and other rail (271, 371, 39, 64, 127, 871,971) and channel (272, 372, 551, 65, 128, 872) interconnections are herein properly characterized as those of rigid attachment. Because saw tables (128) are manufactured by different companies to comprise non-standard or differing specifications, the distance of the longitudinal translation channel (551) from the saw blade (552) of one product may differ from another. Accordingly, a structure intermediate the moveable component (1) and the base plate is required permitting lateral translation which accommodates those non-standard differences. The three main parts are accordingly designated herein as the moveable component (1), the fixed component (2) and the displacement accommodating component (3).

The jig is configured with the moveable component (100) positioned tightly against the fixed component (200) along the latter's angled abutment ridge (221) disposed to slant from the lower right to the upper left of the jig where the guide fence (121) and saw blade (550) are disposed to the operator's right. As before, the moveable curb (110) is part of the moveable component (100) but is here preferentially formed to provide a handhold for its (100) positioning.

There are two adjusting curbs present upon the fixed component (200) to provide proper spacing—an object spacing curb (26) and an indexing curb (210). These (26, 210) are related in function to the originally devised curbs (63, 21, respectively).

The somewhat cumbersome displacement accommodating component (3) has been omitted from the jig's structure with the substitution of lateral displacement accommodating means (300) which entails the fixed component's attachment to the longitudinal translation rail (25) at alternative attachment sites.

The new arrangement herein simplifies the original, avoiding some of the complexities thereof. As mentioned supra, it further is disposed to application not only to woodworking operation but universally to all other centering tasks, be they in the workshop or upon an industrial production line.

The subject matter hereof permits expedient manipulation of the curbs and allows for a universal procedure in its application.

BRIEF DESCRIPTION OF THE DRAWINGS

Solid lines in the drawings represent the invention. Dashed lines represent either non-inventive material, that not incorporated into an inventive combination hereof and which may be the subject of another invention, or that which although so incorporated, lies beyond the focus of attention. A heavily framed outline of a portion of the drawing is representative of a number of specific variations of the more generic feature it symbolically identifies.

In FIG. 2, the subject matter hereof is represented merely as an enantiomer—that is, mirror image—of FIG. 1, indicating a version thereof for use by a left-handed operator, supra. In FIG. 6, a highly preferred embodiment of the invention is shown in which clamp adjustment translation slots (14, 24) are featured in the moveable and fixed components (1, 2, respectively).

FIGS. 7 and 8 comprise a overhead view an embodiment in which alternative positions of its guide fence (121) with reference to the saw blade (552) are similarly shown.

FIG. 9 is a perspective view of a workable piece (500) oriented in preferred disposition for tenon (503) cutting in which the vertical centerline (501) and the predetermined centerline (502) of the piece (500) are indicated.

FIG. 12 comprises a perspective view of an embodiment's moveable component (1).

FIG. 13 comprises a perspective view of an embodiment of the assembly's fixed component (2).

FIG. 14 comprises a perspective view of an embodiment's displacement accommodating component (3).

FIG. 15 comprises a perspective view of an embodiment's spacer assembly (6).

FIG. 24 is a view of an embodiment's moveable component (1) from underneath comprising an angular translation channel (128).

FIG. 25 is an overhead view of an embodiment's fixed component (2) comprising an angular translation rail (227).

FIGS. 26 and 27 are cross-sectional views of an embodiment's moveable component (1) illustrating an angled rail and channel assembly (222) comprising alternative angular translation rail (227) and channel (228) interface arrangements with the assembly's fixed component (2).

FIGS. 28 and 29 are cross-sectional views of an embodiment's moveable component (1) illustrating an angled projection fingers and channel assembly (223) comprising alternative angular projection fingers and channel (229, 228, respectively) interface arrangements with the assembly's fixed component (2).

FIGS. 31-41 are drawings added to those of the original application upon which this CIP is founded.

FIG. 31 comprises a perspective overall view of the assembly which is the subject matter hereof mounted upon a saw table (550).

FIGS. 32 and 33 illustrate in overhead view a zeroed positioning of the moveable and fixed components (100, 200, respectively), FIG. 33 indicating them (100, 200) laterally pulled apart for viewing.

FIGS. 34 and 35 illustrate in overhead view a longitudinally adjusted positioning of those components (100, 200), FIG. 35 similarly indicating them (100, 200) pulled apart for viewing.

FIG. 36 is a cut-away perspective view of lateral displacement accommodating means (300) specifically comprising attachment means (16) and alternative apertures for joining the fixed component (200) to the longitudinal translation rail (25) thereof (200).

FIG. 37 illustrates in perspective a clamp knob and threaded shank (18) together with a clamp well (19) as clamp means (451).

FIGS. 38 and 39 are perspective views demonstrating differences between two specific sorts of clamping arrangements to secure the workable object (556) to the guide fence (121).

FIG. 40 comprises a perspective view of the jig's application to a drill press (554).

FIG. 41 is a cut-away overhead view illustrating the employment of the jig as an instrument for use in a generic sense upon any workable object (556).

DETAILED DESCRIPTION OF THE PREFERRED EMBODIMENTS

Figure 1:
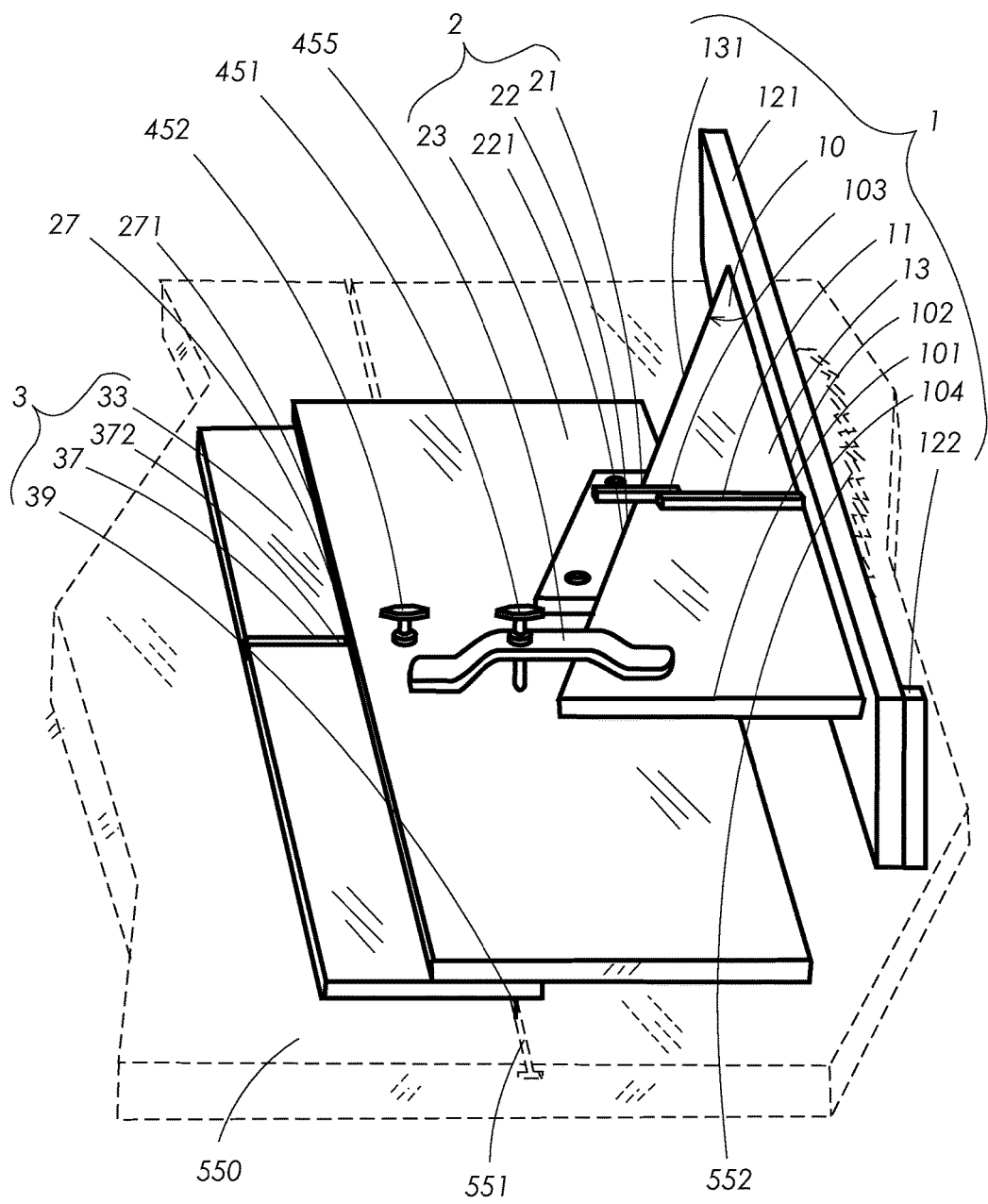
FIGS. 1-6 are perspective views of an embodiment of the assembly in which alternative positions of its guide fence (121) with reference to the saw blade (552) are illustrated, FIGS. 4 and 5 additionally illustrating an alternative fixed component (2) configuration from that of FIGS. 1 and 3.
Figure 2:
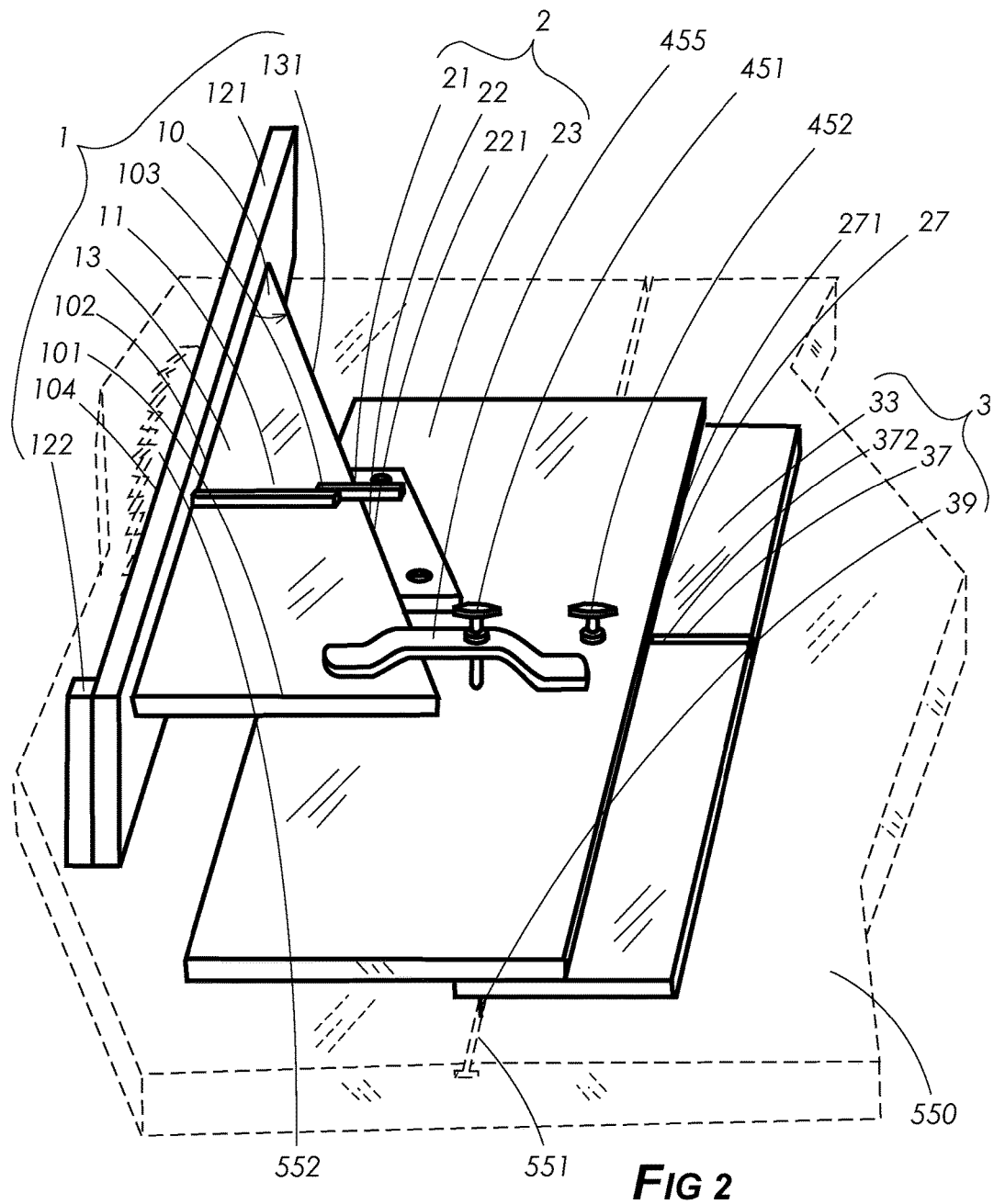

The subject matter hereof comprises a trigonometric saw-cut centering jig assembly disposed for use upon a saw table (550) of a powered table saw, the saw table (550) comprising a saw blade (552) disposed along a cutting plane, and a longitudinal translation channel (551). The jig assembly comprises in general a moveable component (1), a fixed component (2) and a displacement accommodating component (3).

Each component (1, 2, 3) of the preferred embodiment of the assembly comprises a plate-like body (13, 23, 33, respectively) comprising an upper surface and an underside and the position of each (1, 2, 3) with respect to that over which it (1, 2, 3) is disposed is set by clamp means (generally referenced as 451, 452).

The moveable component (1) additionally comprises a moveable curb (11) attached to its plate-like body (23) and a guide fence (121) disposed parallel the saw blade's (552) cutting plane such that a workable piece (500) to be cut positioned snugly against the guide fence (121) and in alignment with the saw blade (552) may be advanced along the saw blade's (552) cutting plane and cut by operation thereof (552). Like its prior art forerunners, the guide fence (121) may additionally comprise a stabilizing abutment stop (122) disposed at its (121) proximal end to secure and steady the workable piece (500). The moveable curb (11) is attached to the moveable component plate-like body (13), preferably upon the upper surface thereof (13).

The moveable component (1), when released from its clamp means (451) to the fixed component (2), may be manually advanced and withdrawn in a direction parallel the cutting plane of the saw blade (552), the distance thereof defined herein as the longitudinal displacement adjusting factor (103).

The fixed component (2) additionally comprises a fixed curb (21) attached to its plate-like body (23) and disposed such that as the moveable component (1) is advanced parallel the saw blade's (552) cutting plane, a portion of the moveable curb (11) is brought into abutment with a portion of the fixed curb (21) in the manner of a stop. Preferably, the fixed component (2) further comprises lateral translation means (27) to laterally position the fixed component (2) upon the displacement accommodating component (3) and be set by clamp means of interconnection (452). The fixed curb (21) is attached to the fixed component plate-like body (23), preferably upon the upper surface thereof (23). Wherever the two curbs (11, 21) are respectively positioned, they (11, 21) must be disposed to contact one another (11, 21) in the intended manner.

Figure 6:
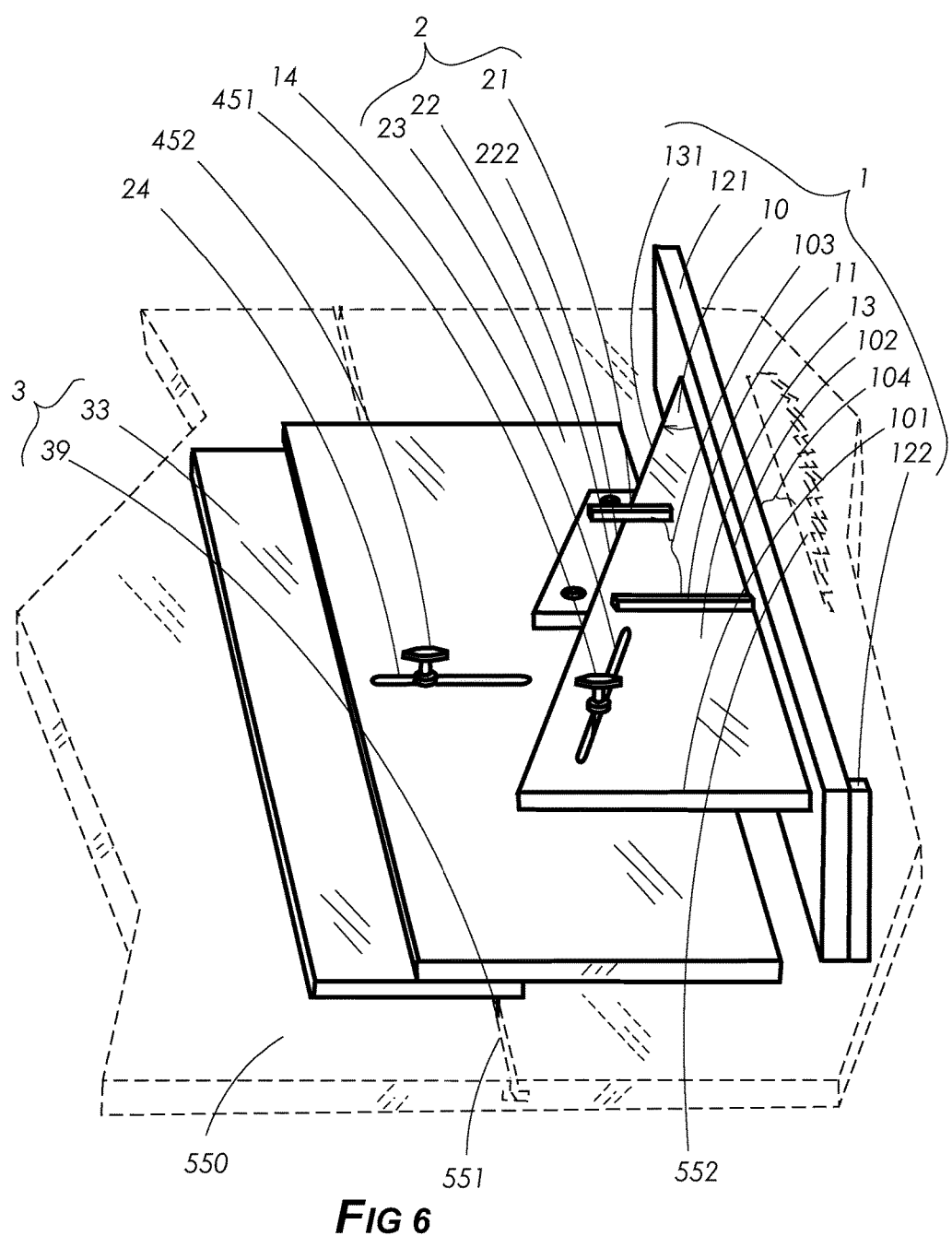
Figure 10:
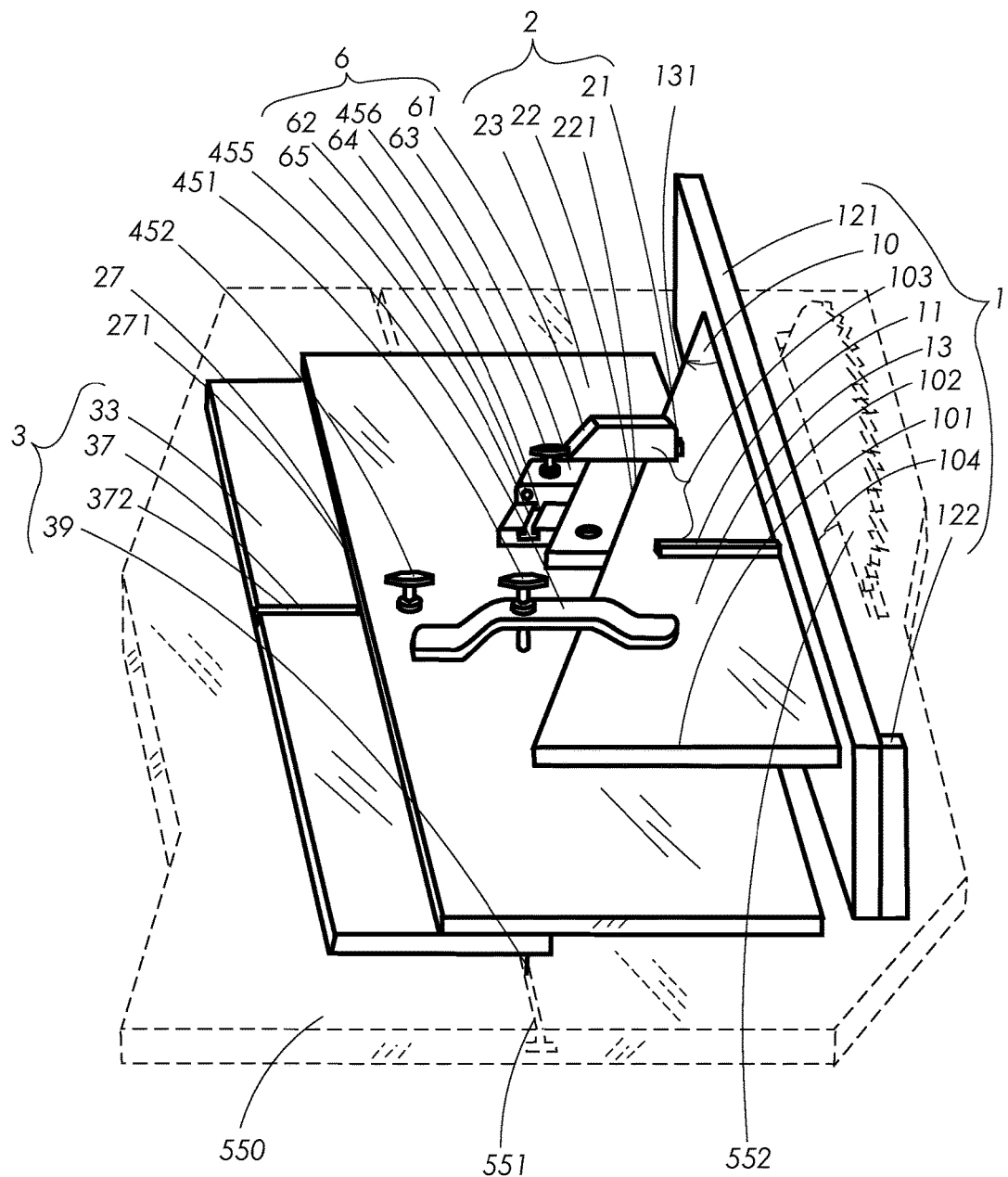
FIGS. 10 and 11 are perspective views of an embodiment including a spacer assembly (6) in which alternative positions of the vertically pivotable spacer (61) with reference to the fixed curb (21) are shown.
Figure 11:
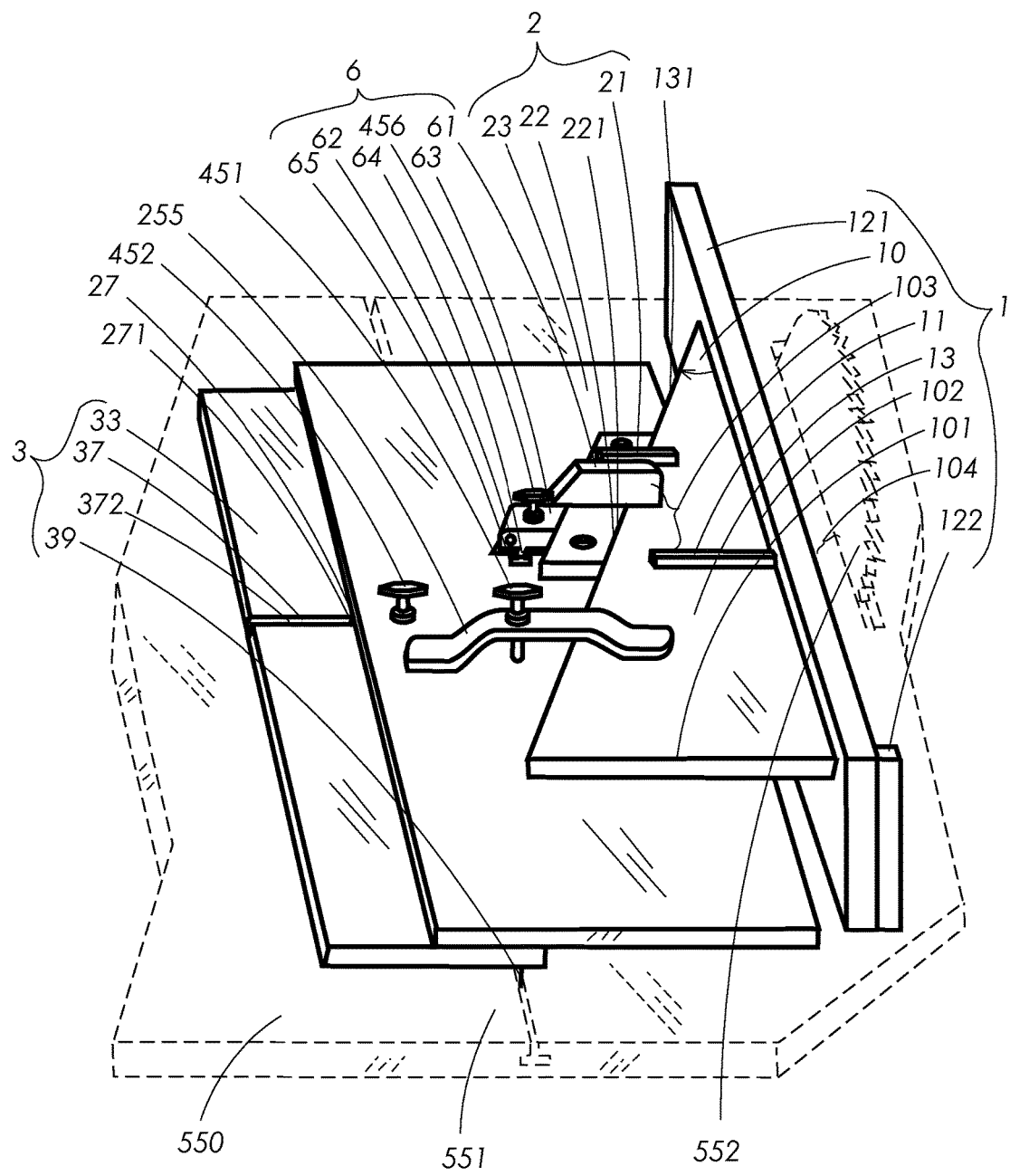

The presence of lateral translation means (27) comprised by the fixed component (2) facilitates lateral translation thereof (2) and more dependably assures proper alignment of the assembly's components. In a highly preferred embodiment of the invention, a fixed component's clamp adjustment translation slot (24) is disposed transverse the saw blade's (552) cutting plane and extends through the fixed component's plate-like body (23). The fixed component's clamp adjustment translation slot (24) provides lateral clearance for fixed component to displacement accommodating component clamp means (452) further discussed ante. By reason of its (24) configuration and disposition transverse the saw blade's (552) plane, as shown in FIG. 6, it, by itself (24), serves to maintain proper alignment during lateral translation, obviating the need for other lateral translation means-specifically, the fixed component's lateral translation means (27) otherwise preferably incorporated. Nonetheless, as an added reliability measure, both elements—the fixed component's clamp adjustment translation slot (24) and the fixed component's lateral translation means (27) may both be incorporated.

The displacement accommodating component (3) may additionally comprises lateral translation means (37) mated to the fixed component's lateral translation means (27) by reason of their (27, 37) interconnection, where such means (27) are present. The fixed component's lateral translation means (27), where present, may comprise a rail (271) and the displacement component's lateral translation means (37), a channel (372) to which the rail (271) is mated or, alternatively, the moveable component's lateral translation means (27) may comprise a channel (272) and the displacement component's lateral translation means (37), a rail (371) mated to the channel (272). Any translation means (12, 27, 37, 97) which allows free movement between members is acceptable. Rails (39, 64, 99, 127, 227, 271, 371, 871, 971) and channels (65, 128, 228, 272, 372, 551, 872,972) are desirable because of the ease with which one member can be made to slide along against the other.

The displacement accommodating component (3) further comprises a longitudinal translation rail (39) mated to and interconnected with the saw table's longitudinal translation channel (551) such that the displacement accommodating component (3) may be repositioned upon the saw table (550) and maintained parallel the cutting plane of the saw blade (552.).

The main reason for providing either lateral translation means (27, 37) between the fixed component (2) and the displacement accommodating component (3) or a fixed component's clamp adjustment translation slot (24), or perhaps both {24, 27, 37), is because not all saw tables (550) are manufactured with identical measurements for their (550) parts. It is not unusual for the distance between the saw blade (552) and the saw table's longitudinal translation channel (551) to vary from one manufactured assembly to another. It should be recognized that once the displacement accommodating component (3) has been connected to the saw table (550) by interconnection of its longitudinal translation rail (39) with the saw table's longitudinal translation channel (551), only limited capability of laterally repositioning the entire inventive assembly—the subject matter hereof—would otherwise remain. It is true the moveable component (1) may be advanced or withdrawn parallel the cutting plane of the saw blade (552), permitting lateral repositioning equal to corresponding changes thereby effected in the lateral displacement adjusting factor (104). It is also true the entire inventive assembly can be advanced and withdrawn by readjusting the displacement accommodating component's longitudinal translation rail (39) within the saw table's longitudinal translation channel (551). However, the configuration and disposition of the moveable component (1) inherently limits the amount of lateral displacement possible. Moreover, provision for the more direct lateral translation between the fixed and the displacement accommodating components (2, 3, respectively) makes use of the entire inventive assembly more convenient.

The inventive assembly which is the subject matter hereof further comprises angle determinant means (22) disposed at an acute angle measured clockwise from the saw blade's (552) cutting plane, the angle herein defined as the jig determined angle (10). Upon advancing or withdrawing the moveable component (1) in a direction parallel the cutting plane of the saw blade (552), the advancement or withdrawal conforms only to the path provided by the angle determinant means (22) such that the guide fence (121) is moved, respectively, toward or displaced from the saw blade (552) effecting a separation distance therefrom (552), transverse the saw blade's (552) cutting plane. The separation distance is herein defined as the lateral displacement adjusting factor (104).

Any one of several forms may comprise the angle determinant means (22) addressed herein. The angle determinant means (22) may, thus, be configured and disposed such that the fixed component (3) comprises an angled abutment ridge (221) and the moveable component comprises a running abutment edge (131). It (22) may alternatively be configured and disposed such that the moveable component (1) and the fixed component (2) comprise mated members of an angled rail and channel assembly (222). It (22) may similarly otherwise be configured and disposed such that those components (1, 2) comprise mated members of an angled projection fingers and channel assembly (223).

The movements of the components (1, 2) manifest angular vectors wherein the distance of the moveable component's (1) advancement or withdrawal parallel the saw blade's (552) cutting plane manifests a longitudinally disposed vector comprising a first side of a triangle. The transverse separation distance between the moveable component's fence (121) and the saw blade (552) manifests a laterally disposed vector comprises a second side of the triangle. The interior angle between the first and second sides comprises a right angle. A projection of the angle determinant means (22) intersecting the first and second sides comprises a third side of a manifested right triangle and represents the hypotenuse thereof. The first side thereof represents a cosine related side (102) and the second side thereof represents a sine related side (101). The vertex of the jig determined angle (10) comprises the most longitudinally distal portion of the right triangle. It should be observed, then, that, unless otherwise specified herein, the moveable component (1) is not necessarily restricted to any particular shape so long as the trigonometric functions can be manifested in this abstract manner.

Figure 3:
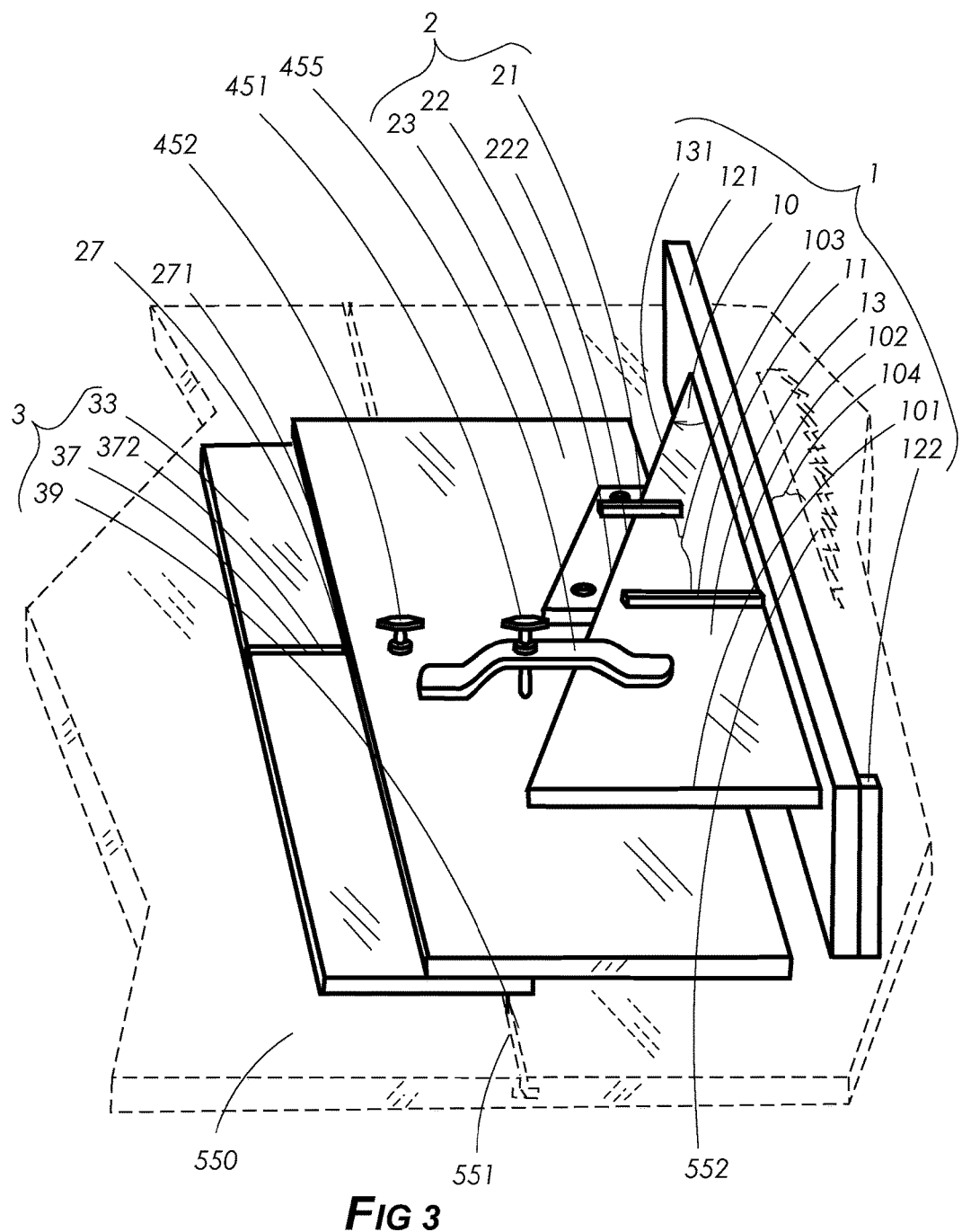
Figure 4:
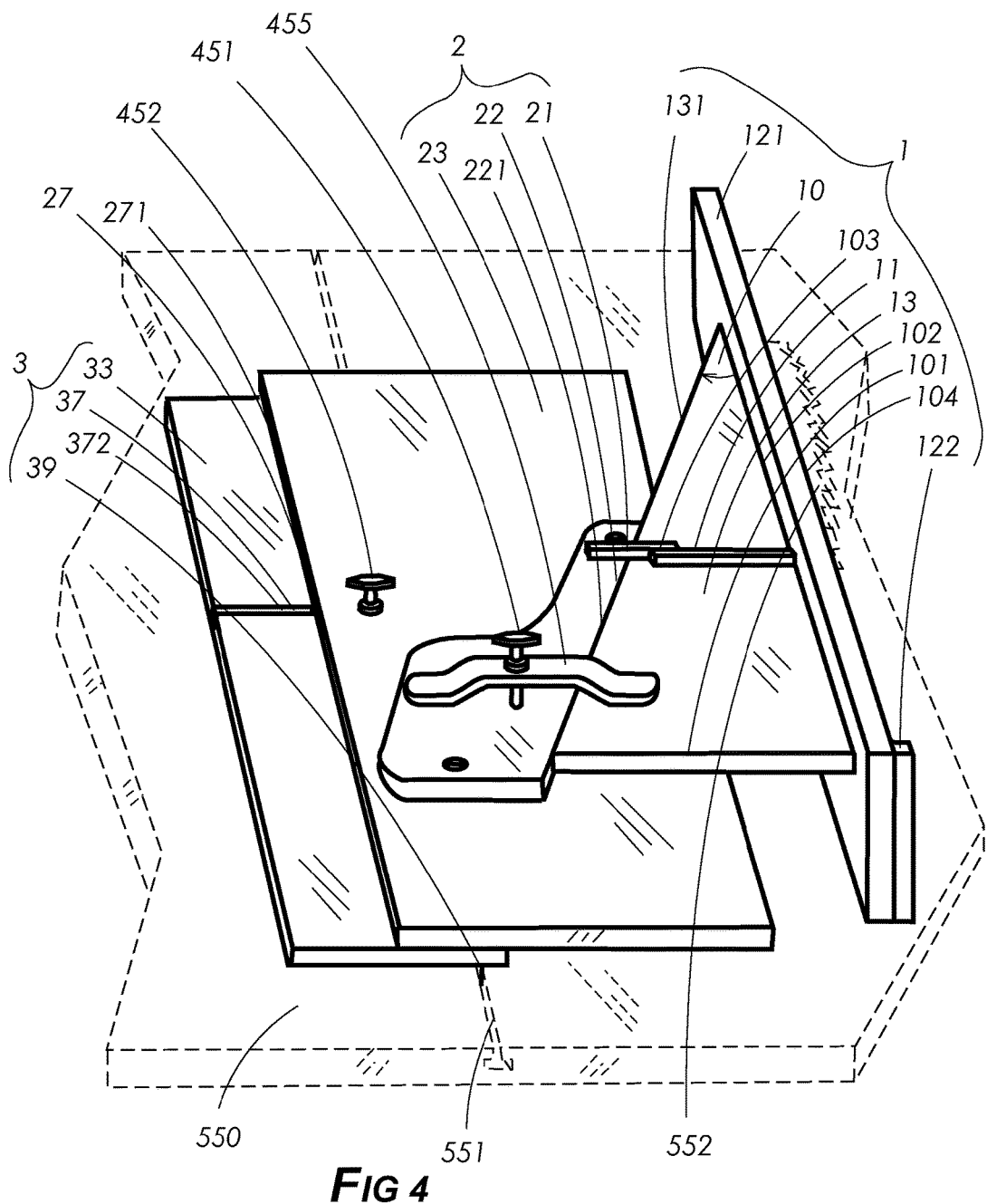
Figure 5:
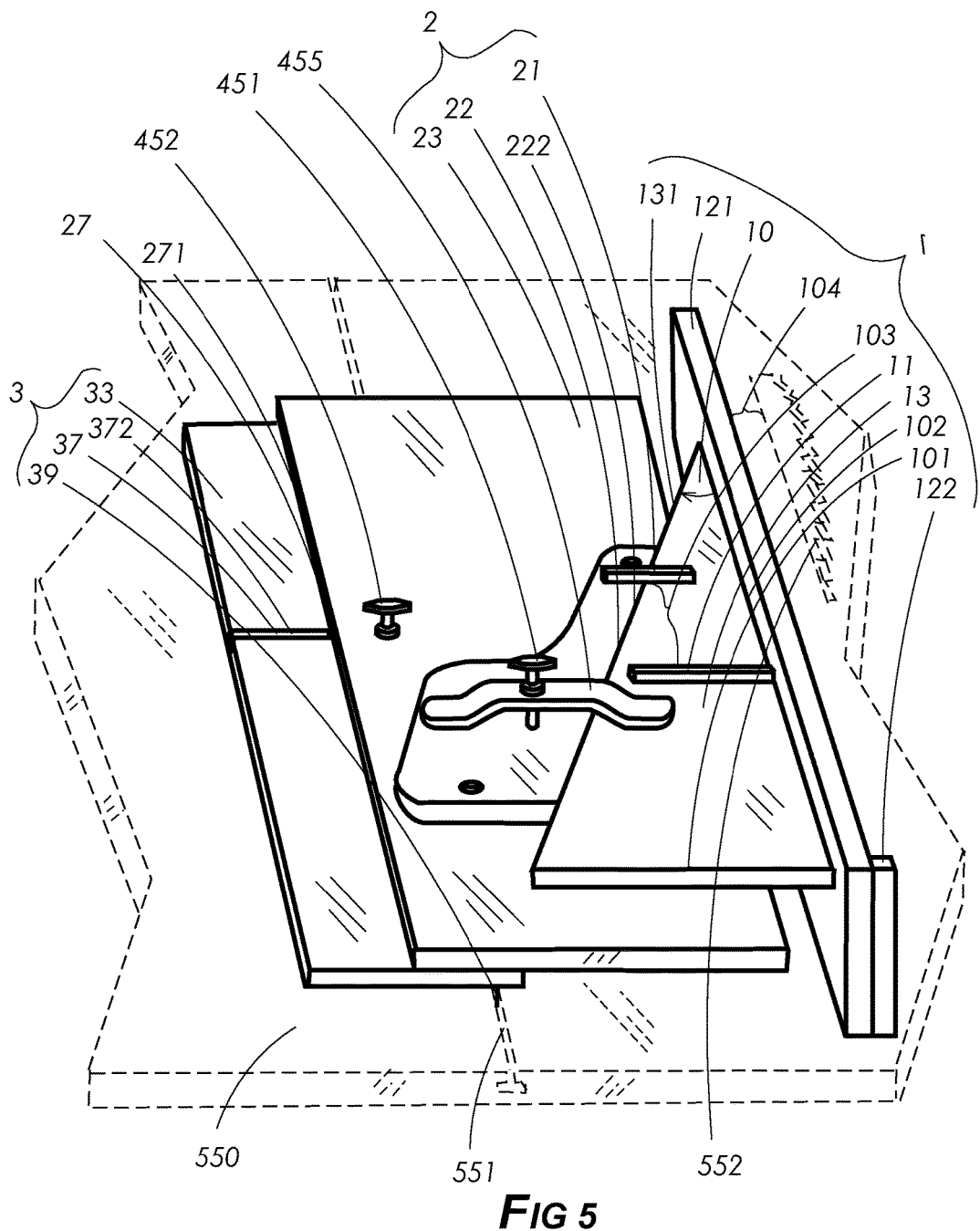

Advancing the moveable curb (11) such that it is brought together with the fixed curb (21) manifests a longitudinal displacement adjusting factor (103) of zero. The fixed component (2) may then be laterally repositioned with reference to the displacement accommodating component (3) such that the guide fence (121) is caused to abut the saw blade (552), manifesting a lateral displacement adjusting factor (104) of zero. A workable piece (500) may then be positioned with its (500) width disposed snugly between the curbs (11, 22), manifesting a longitudinal displacement adjusting factor (103) equal to the distance between the curbs (11, 12). By reason of the jig determined angle (10) and the sine and cosine values of the manifested right triangle, the lateral displacement adjusting factor (104) comprises the product of the longitudinal displacement adjusting factor (103) and a fraction equal to the ratio of the sine value for the jig determined angle (10) to the cosine value therefor. This positions the workable piece (500) adjacent the saw blade's (552) cutting plane such that a corresponding fraction of its (500) width is disposed between the guide fence (121) and the saw blade (552), resulting in the assembly's disposition shown in FIG. 1. In colloquial parlance, the preparatory manipulations addressed may be regarded as "zeroing the assembly". Withdrawing the moveable component (1) in a direction parallel the saw blade's (552) cutting plane disposes it (1) as shown in FIG. 3. These same observations may be made by examining FIGS. 4 and 5 as well as FIGS. 7 and 8.

These zero setting steps may be undertaken in more or less reverse order wherein, beginning with the assembly's disposition in FIG. 3, the moveable component (1) is advanced parallel the saw blade's (552) cutting plane such that the moveable component's guide fence (121) is caused to abut the saw blade (552), thereby achieving a lateral displacement adjusting factor (104) of zero, the assembly's disposition shown in FIG. 1. In this disposition, the moveable curb (11) may be caused by other adjustments to abut the fixed curb (21), thereby also achieving a longitudinal displacement adjusting factor (103) of zero.

If the jig determined angle (10) is made to equal 26.565 degrees, the sine thereof equals 0.447 and the cosine, 0.894. For that right triangle, then, by reason of the ratio of the sine value to the cosine value, the sine related side (101) of the manifested right triangle will equal in length one-half that of the cosine related side (102) thereof. Positioning a workable piece (500) with its (500) width disposed snugly between the curbs (11, 21) effects a longitudinal displacement factor (103) equal to the distance between the curbs (11, 21) and thereby laterally displaces the guide fence (121) from the saw blade (552) a distance comprising by reason of the 26.565 degree angle and the 0.447 sine and 0.894 cosine values of the manifested right triangle, a lateral displacement adjusting factor (504) equal to one-half the width of the workable piece (500), thereby positioning the workable piece's vertical centerline (501) adjacent the saw blade's (552) cutting plane.

It should be observed that in following this protocol, the saw blade (552) does not actually cut directly at the workable piece's vertical centerline (501) but rather, just enough beyond it to allow the span of one-half the workable piece's (500) width to remain. Thus, it is unnecessary to provide for any additional clearance to off-set the width of the saw blade (552).

When the assembly is used to cut a tenon (503}—its most common application—the width of the tenon (503) is made to equal that of the mortise it (503) is formed to fit and, as mentioned supra, a drill-bit-chisel loaded upon a drill press is often employed to that end.

It is often inconvenient to remove the drill-bit-chisel from the drill press in which it has been loaded and emplace it between the curbs (21, 31). Accordingly, a spacer assembly (6) attached to the fixed component's plate-like body (23) is provided comprising a vertically pivotable spacer (61) pivotable upon a spacer assembly pivot axle (62) and configured with width selected to equal that of a given mortise chisel, often that equal to what some have perceived to be the most common chisel or mortise width-say, one inch or three-quarters of an inch. The spacer assembly (6) is attached to the upper surface of the fixed component (2) and disposed such that its vertically pivotable spacer (61) is caused to pivot downward, disposing it (61) upon the fixed component's (2) upper surface proximate the fixed curb which (21), for such purpose, must also be accordingly disposed upon that surface. Once the vertically pivotable spacer (61) is disposed to abut the fixed curb (21), the width of the workable piece (500) is emplaced snugly adjacent the spacer (61) and the moveable curb (11) is advanced to abut the workable piece (500). A longitudinal displacement adjusting factor (103) equal to the combined widths of the spacer (61) and workable piece (500) is thereby provided which correspondingly manifests a lateral displacement adjusting factor (103) equal to exactly half that.

In cutting the tenon (503), then, the saw blade (552) is caused to cut a first cheek thereof (503) and, upon afterward rotating the workable piece (500) 180 degrees, to cut a second cheek thereof (503). The two cuts, by reason of the readjusted longitudinal displacement adjusting factor (103) for the combined workable piece (500) and spacer (61) width, form a tenon (503) of precise spacer (61) width.

Optionally, the spacer assembly (6) may additionally comprise an adjustment block (63) in turn comprising a translation rail (64) and a translation channel (65). The rail (64) and channel (65) combination are disposed to allow the vertically pivotable spacer (61) to be translated from the fixed curb (21), thereby allowing readjustment for a chisel—hence mortise—of different width. The assembly comprises spacer adjustment clamp means (456) to set the spacer assembly's rail (64) and channel (65) translation.

What has been thus far described for the moveable component's plate-like body (13) permits considerable variance in its configuration. In a preferred embodiment, however, the moveable component's plate-like body (13) is itself (13) configured as a right triangle embodying the characteristics of the manifested right triangle considered supra. Thus, the plate-like body (13) comprises a first interior angle distally disposed along a parallel to the saw blade's (552) cutting plane, a second interior angle comprising the right angle proximally disposed along a side parallel the saw blade (552) and a third interior angle laterally disposed to the right angle. As was observed in the manifested triangle, supra, the side adjacent the distal interior angle and running to the right angle comprises the triangle's cosine related side (102). The side opposite the right angle comprises the triangle's hypotenuse and the side opposite the distal angle comprises the triangle's sine related side (101). Again, if the right triangle's distal interior angle, the jig determined angle (10), equals 26.565 degrees, the side opposite the distal interior angle is equal in length to one-half that of the side adjacent the distal interior angle by reason the 0.447 sine and 0.894 cosine values of that angle.

Once the components (1, 2, 3) have been positioned for the assembly's use, they (1, 2, 3) must be dependably fixed in place. Clamp means (451, 452) mentioned supra are, therefore, provided for to this end. Whatever depiction of a given clamp might be shown as in the drawings, it is intended any clamp known to prior art may be employed. In that respect, the use of the term "clamp" is intended herein to comprise a more or less generic sense as clearly shown in FIGS. 16 and 17. The reason for this assertion in that it is not the clamps which comprise the inventive assembly with innovation, the clamps being merely common connective elements, much in the way nails or screws are used to fasten other inventive assembly parts together. The same is true of the various configurations for rail (39, 64, 99,127, 227, 271, 371, 871, 971) and channel (65, 128, 228, 272, 372, 551, 872,972) assemblies. Any prior art form for those paired components may be employed in the inventive assembly, so long as translation is attained between them. That understood, then, the assembly comprises the moveable component to fixed component clamp means (451) and the fixed component to displacement accommodating component clamp means (452). Any one of a number of commercially available clamp configurations may be employed.

Certain embodiments of the inventive assembly may comprise pass-through openings (256) to accommodate the inclusion of the clamp means (451, 452), depending upon the clamp means (451, 452), selected. In other embodiments, certain of the clamp means (451 and 452), —the moving component to fixed component clamp means (451), for instance—may merely be attached to the fixed component's plate-like body (23). In some embodiments, the fixed component (2) comprises pass-through openings (256) for both clamp means (451, 452). It (2) comprises a first such opening (256) to allow upwardly extending passage through it (2) of the moveable component to fixed component clamp means (451) and a second such opening (256) to allow upwardly extending passage through it (2) of the fixed component to displacement accommodating component clamp means (452). In a highly preferred embodiment, the moveable component (1) comprises a clamp adjustment translation slot (14) which extends through its plate-like body (13) disposed in a direction equal to the jig determined angle (10) such that the moveable component to fixed component clamp means (451) may be freely moved during advancement and withdrawal of the moveable component (1) in a direction parallel the saw blade's (522) cutting plane. The moveable component's clamp adjustment translation slot (14) obviates the presence of one of the fixed component's clamp means openings (256). As noted, supra, a fixed component's clamp adjustment translation slot (14) obviates the presence of the other (256).

Figure 16:
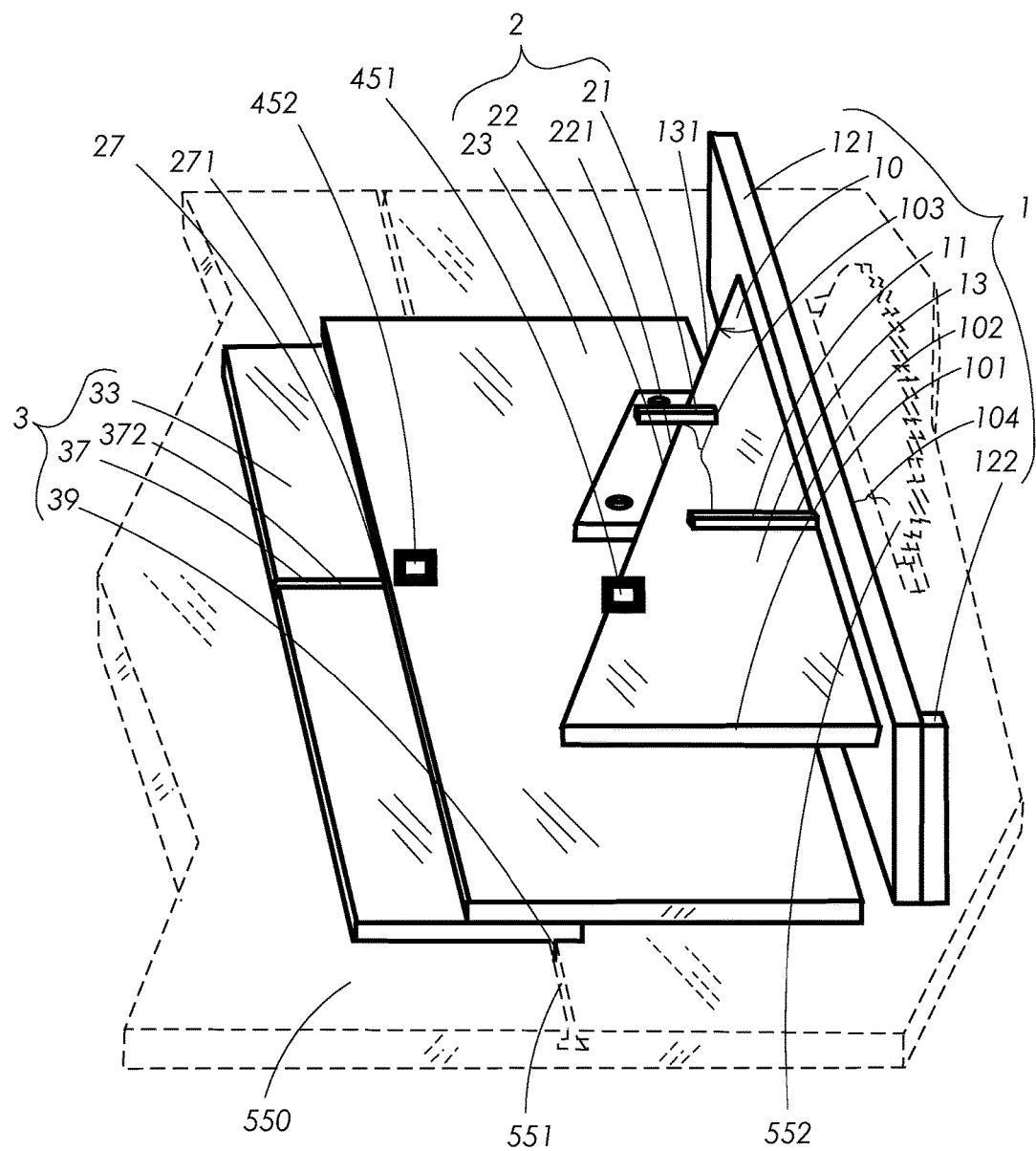
FIGS. 16 and 17 are perspective views of an embodiment of the assembly illustrating generic representations of respective clamp means (451 and 452), the latter depiction also including spacer assembly clamp means (456).
Figure 17:
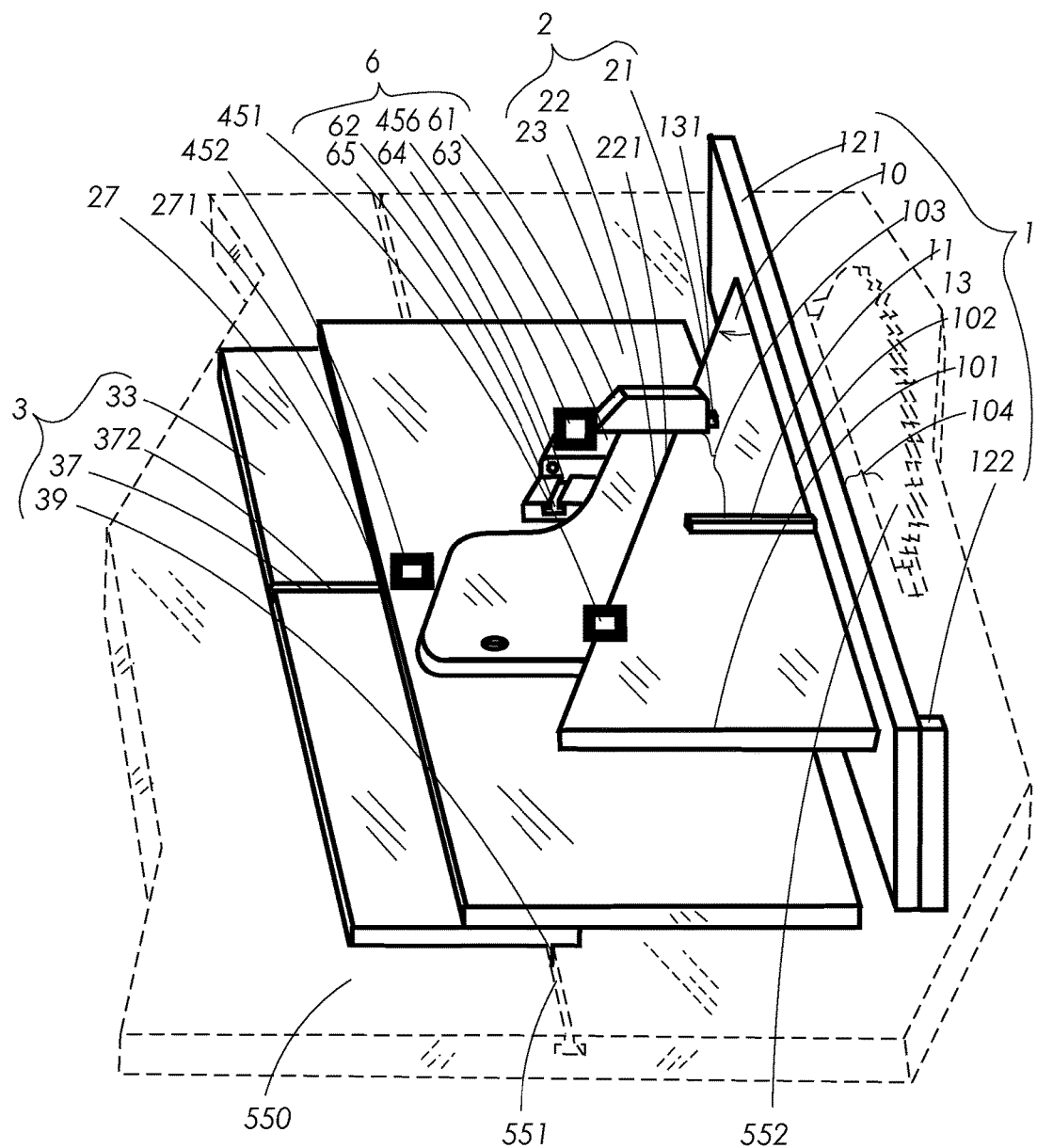

In certain embodiments and depending upon the particular structure, the moveable component to fixed component clamp means (451) may comprise either a mono-level or a bi-level straddling clamp brace (454, 455, respectively) to set the adjustment of the moveable component (1) upon the fixed component (2). Thus, in an assembly in which the anchoring point of the moveable component to fixed component clamp means (451) is disposed upon the fixed component's plate-like body (23) at the same level as that of the moveable component's plate-like body (13) as in FIGS. 4, 5, 13 and 17—a mono-level straddling clamp means brace (454) is provided. In an assembly in which the anchoring point of the moveable component to fixed component clamp means (451) is disposed upon the fixed component's plate-like body (23) at a level lower than the moveable component's plate-like body (13*ras* in the embodiments shown in FIGS. 1, 2, 3, 7, 8, 10,11 and 16—a bi-level straddling clamp means brace (455) is provided. As one intends to withdraw the moveable component (1) parallel the cutting plane of the saw blade (552), the moveable curb (11) may occasionally become partially blocked by obstruction of the straddling clamp brace (454, 455) for the moveable component to fixed component clamp means (451). While FIGS. 16 and 17 illustrate generic representations for the various clamp means (451, 452 and 456), a moveable component to fixed component clamp means (451) such as that shown in FIG.

Figure 18:
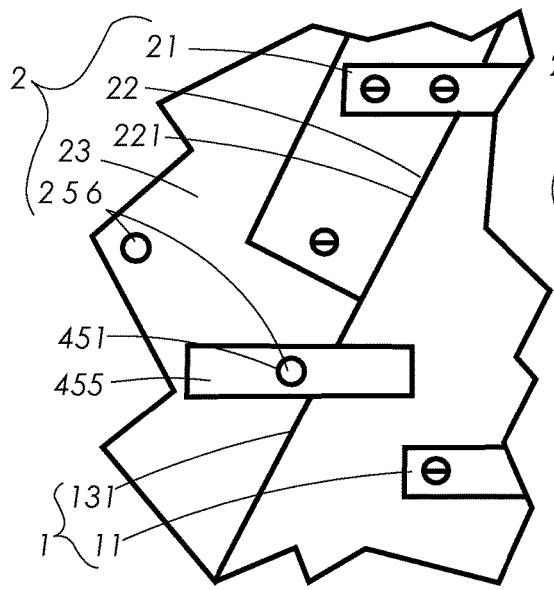
FIGS. 18-21 are cut-away overhead views of a portion of the assembly illustrating alternative dispositions of a straddling clamp means brace (454, 455) to set the moveable component (1) to the fixed component (2) to provide desired operative adjustment clearance.
Figure 19:
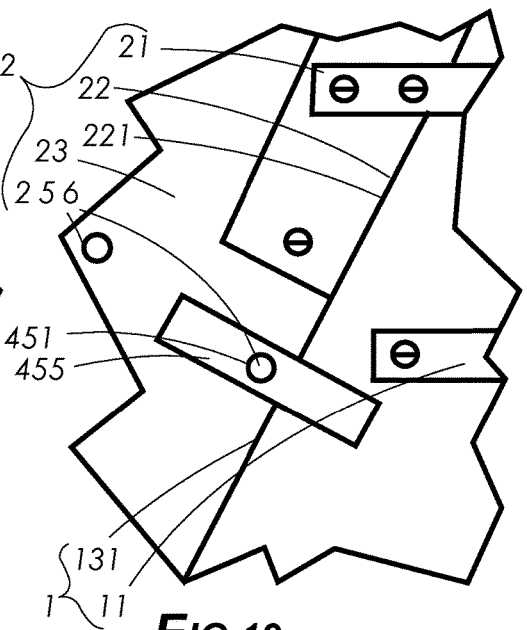
Figure 20:
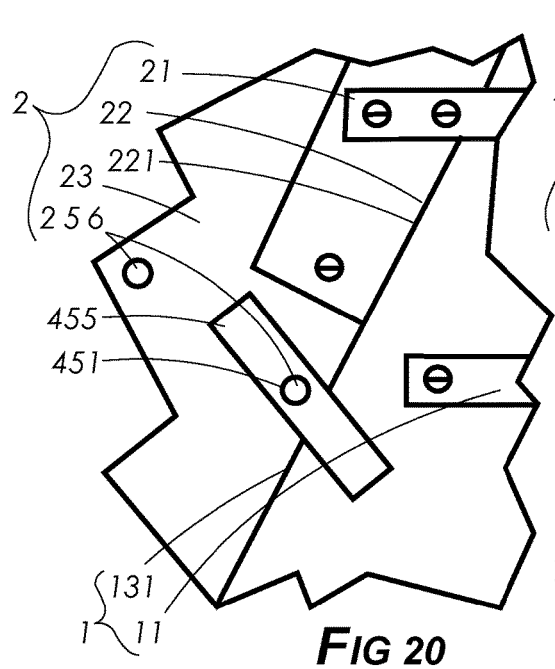
Figure 21:
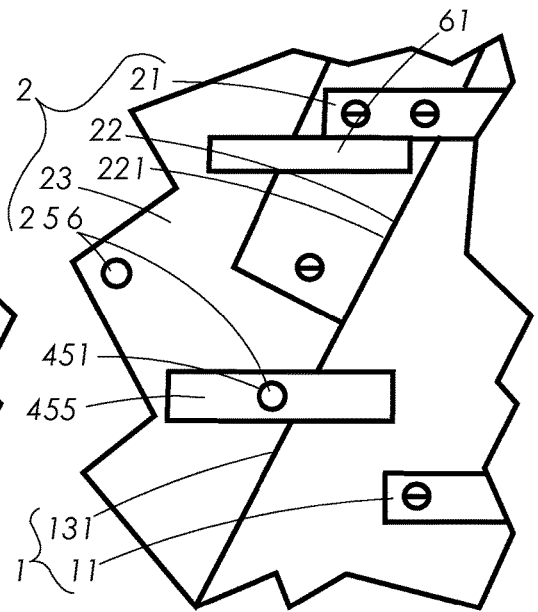

1 and several other drawings in which the straddling clamp brace (454, 455) may be turned at an angle to provide clearance to the moveable curb (11) is preferred. Thus, in FIGS. 19 and 20, the straddling clamp brace (455) is shown turned from its disposition in FIG. 18 to accomplish that end. FIG. 20, in which a vertically pivotable spacer (61) is provided, merely shows the same straddling clamp brace (455) disposition as in FIG. 17.

Figure 22:
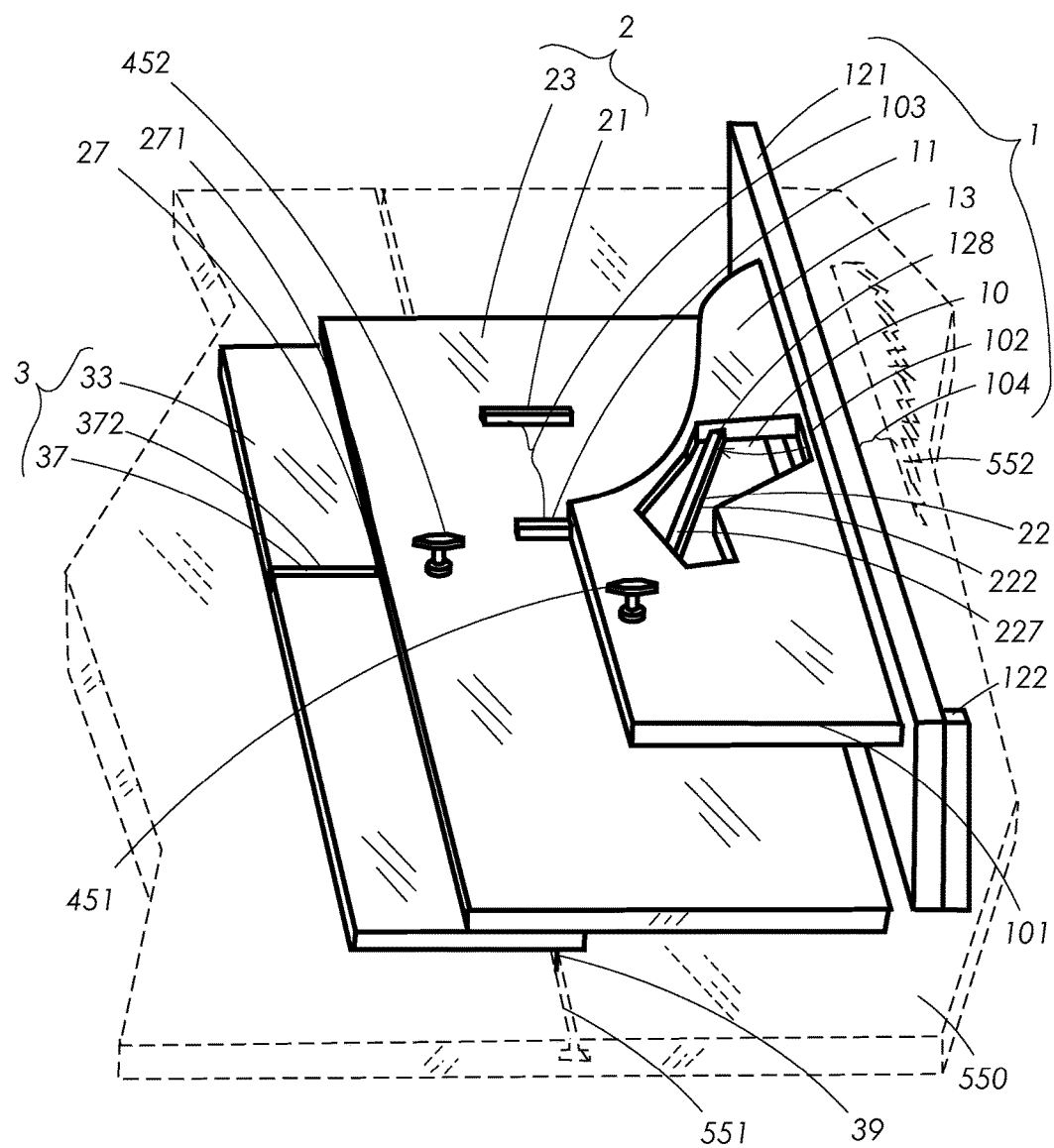
FIG. 22 is a perspective cut-away view of an embodiment of the assembly comprising an angled rail and channel assembly (222) as angular determinant means (22).

The angled abutment ridge (221), in graphically outlining in part a right triangular figure and ostensibly presenting a surface against which the moveable component (1) is laterally restrained in advancement and withdrawal, illustrates with a fair degree of clarity the concept of the angle determinant means (22). However, the other constructions the means (22) allows for are equally effective. For the angle determinant means (22) comprising an angled rail and channel assembly (222), the moveable component (1) may comprise an angular translation channel (128) disposed within the underside of its plate-like body (13) as depicted in FIG. 22, at an acute angle measured clockwise with reference to the saw blade's cutting plane. In this arrangement, the fixed component (2) comprises disposed upon the upper surface of its plate-like body (23) an angular translation rail (227) mated to the angular translation channel (128). As the moveable component (1) is advanced and withdrawn parallel the saw blade's cutting plane, it (1) is laterally constrained in the same manner observed with the angled abutment ridge (221) and angled running abutment edge (131) arrangement. As illustrated in FIGS. 26 and 27, the angled rail and channel assembly (222) may have its elements reversed such that the fixed component (2) comprises an angular translation channel (228) and the moveable component (1) an angular translation rail (127) upon its (1) underside.

Figure 23:
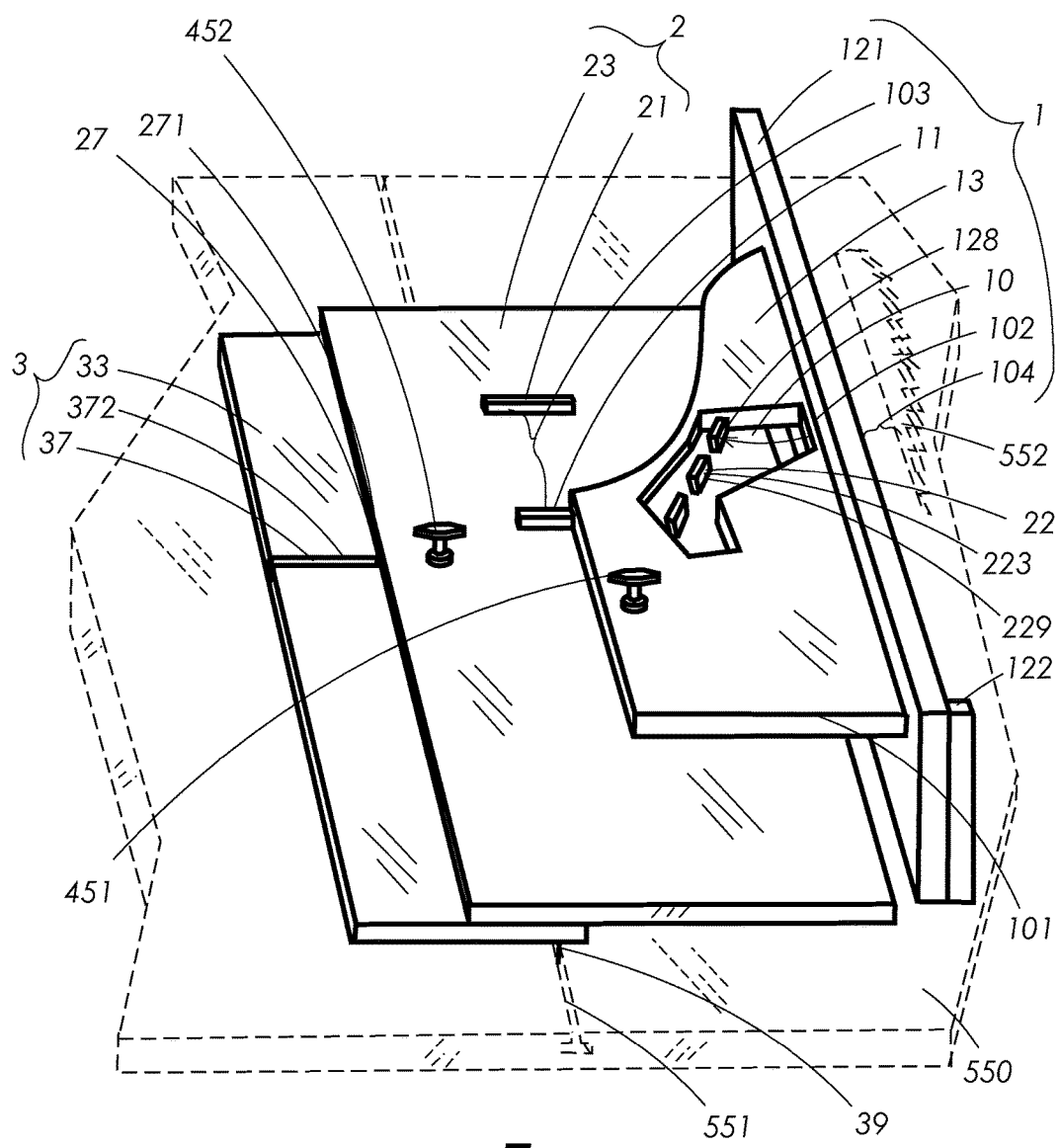
FIG. 23 is a perspective cut-away view of an embodiment of the assembly comprising an angled projection fingers and channel assembly (223) as angular determinant means (22).

Similarly, for angle determinant means (22) comprising an angled projection fingers and channel assembly (223), the moveable component (1) may, again as depicted in FIG. 22, comprise an angular translation channel (128) disposed within the underside of its plate-like body (13) at an acute angle measured clockwise with reference to the saw blade's cutting plane. In this arrangement, the fixed component (2) comprises disposed upon the upper surface of its plate-like body (23) angular translation projection fingers (229) mated to the angular translation channel (128) as depicted in FIG. 23. As the moveable component (1) is advanced and withdrawn parallel the saw blade's (552) cutting plane, it (1) too, is laterally constrained in the same manner observed with the angled abutment ridge (221) angled running abutment edge (131) arrangement. As illustrated in FIGS. 28 and 29, the angled projection fingers and channel assembly (223) may have its elements reversed such that the fixed component comprises an angular translation channel (228) and the moveable component (1) angular translation projection fingers (129) upon its (1) underside. An illustrative configuration of a series of projection fingers (129, 229) is shown in FIG. 23.

In an arrangement in which the moveable component would otherwise comprise an angular translation channel (128) as part of the angular determinant means (22), the inclusion of a moveable component's clamp adjustment slot (14) for use in conjunction with moveable component to fixed component clamp means (451) may be employed to the same end. Thus, the clamp adjustment slot (14) may supplant the angular translation channel (128). By reason of the adjustment slot's (14) configuration and disposition in alignment with the jig determined angle (10), as shown in FIG. 6, it, by itself, (14) serves to maintain proper angular alignment during advancement or withdrawal of the moveable component in a direction parallel the saw blade's (552) cutting plane. Even where the angular rail and channel assembly (222) has its elements reversed such that the moveable component comprises the angular translation rail (127) as its part of the assembly (222) and the fixed component comprises the angular translation channel (228) as its part thereof (222), the moveable component's clamp adjustment slot (14) and moveable component to fixed component clamp means (451) may be employed in alignment and conjunction with the angular rail and channel assembly (222) and lock or anchor into it (222) to set the desired adjustment position. This partial merger of functions parallels that addressed supra for the movable component's clamp adjustment translation slot (14) in its conjunction with its lateral translation means (27). Yet, if desired, as an added reliability measure, both elements—the moveable component's clamp adjustment translation slot (14) and the moveable component's angular translation means (127) may both be separately incorporated—side-by-side, for instance.

Figure 30:
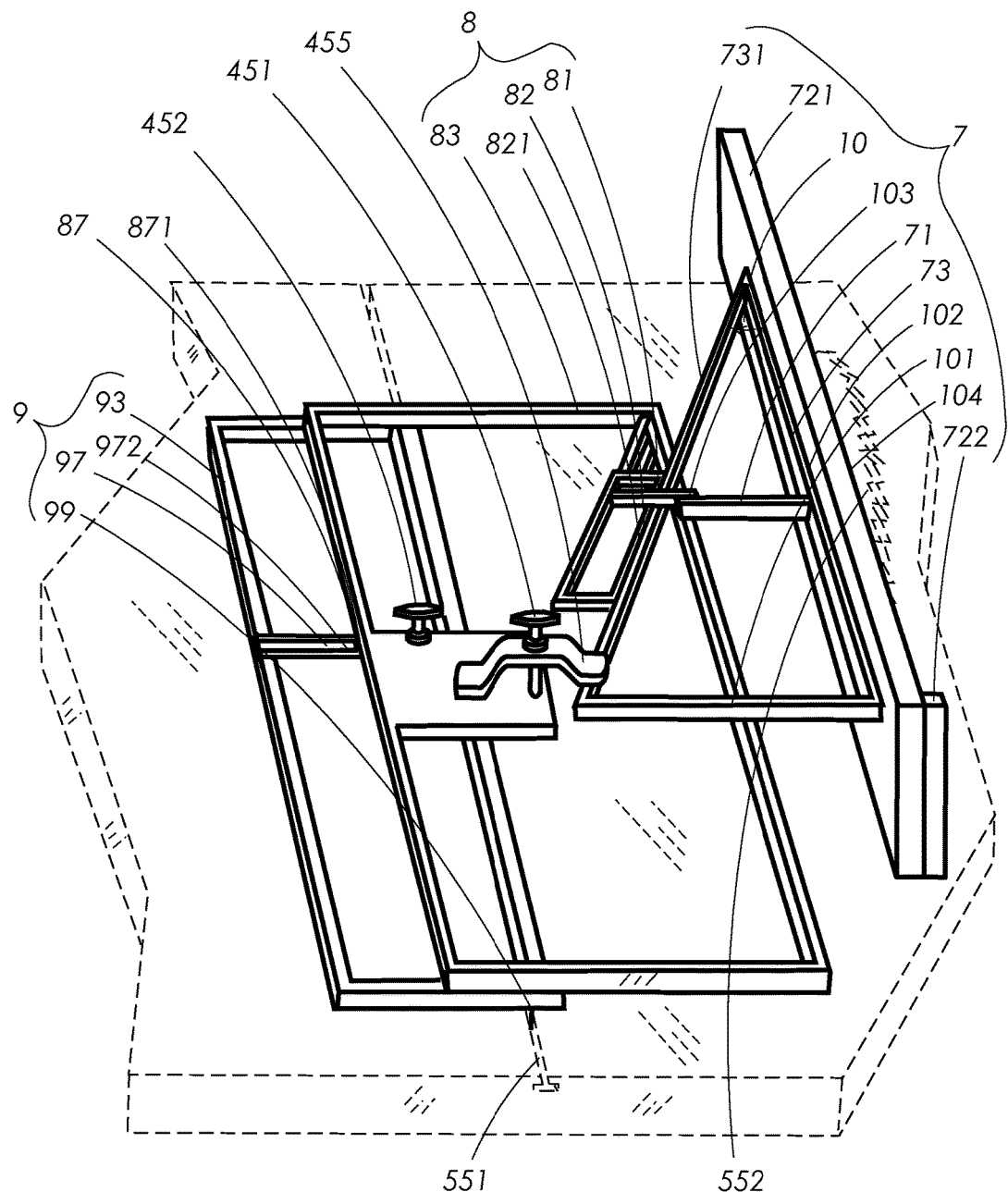
FIG. 30 comprises a perspective view of an assembly embodied as a framework (73, 83, 93), as distinguished from those comprising the plate-like body (13, 23,33) constructions otherwise addressed herein.

The structure of the inventive assembly need not be configured with plate-like constituents but, rather, as a weight reduction measure, be constructed as a framework (73, 83, 93) as that shown in FIG. 30. in which the components are disposed and function in the same manner as with the plate-like structures. If desired, the assembly may comprise a combination of the more solid plate-like components and partial framework constructions. In paralleling the structure of the assembly comprising plate-like bodies (13, 23, 33), the framework assembly also comprises the same following constituents disposed in the same manner as for the assembly comprising plate-like bodies (13, 23, 33), each of which should be considered to include a prefix "frame assembly-": A frame assembly's moveable component (7), a frame assembly's fixed component (8), a frame assembly's displacement accommodating component (9), a frame assembly's jig determined angle (10), a frame assembly's moveable curb (71), a frame assembly's moveable component frame body (73), a frame assembly's fixed curb (81), a frame assembly's angle determinant means (82), a frame assembly's fixed component frame body (83), a frame assembly's displacement accommodating component frame body (93), a frame assembly's displacement accommodating component's lateral translation means (97), a frame assembly's displacement accommodating component's longitudinal translation rail (99), a frame assembly's moveable component's sine related side (101), a frame assembly's moveable component's cosine related side (102), a frame assembly's guide fence (721), a frame assembly's stabilizing abutment stop (722), a frame assembly's moveable component's running abutment edge (731), a frame assembly's angled abutment ridge (821), a frame assembly's pass-through opening for a clamp (856) a frame assembly's lateral translation rail (871) a frame assembly's lateral translation channel (872), a frame assembly's displacement accommodating component's lateral translation rail (971) and a frame assembly's displacement accommodating component's lateral translation channel (972).

Figure 31:
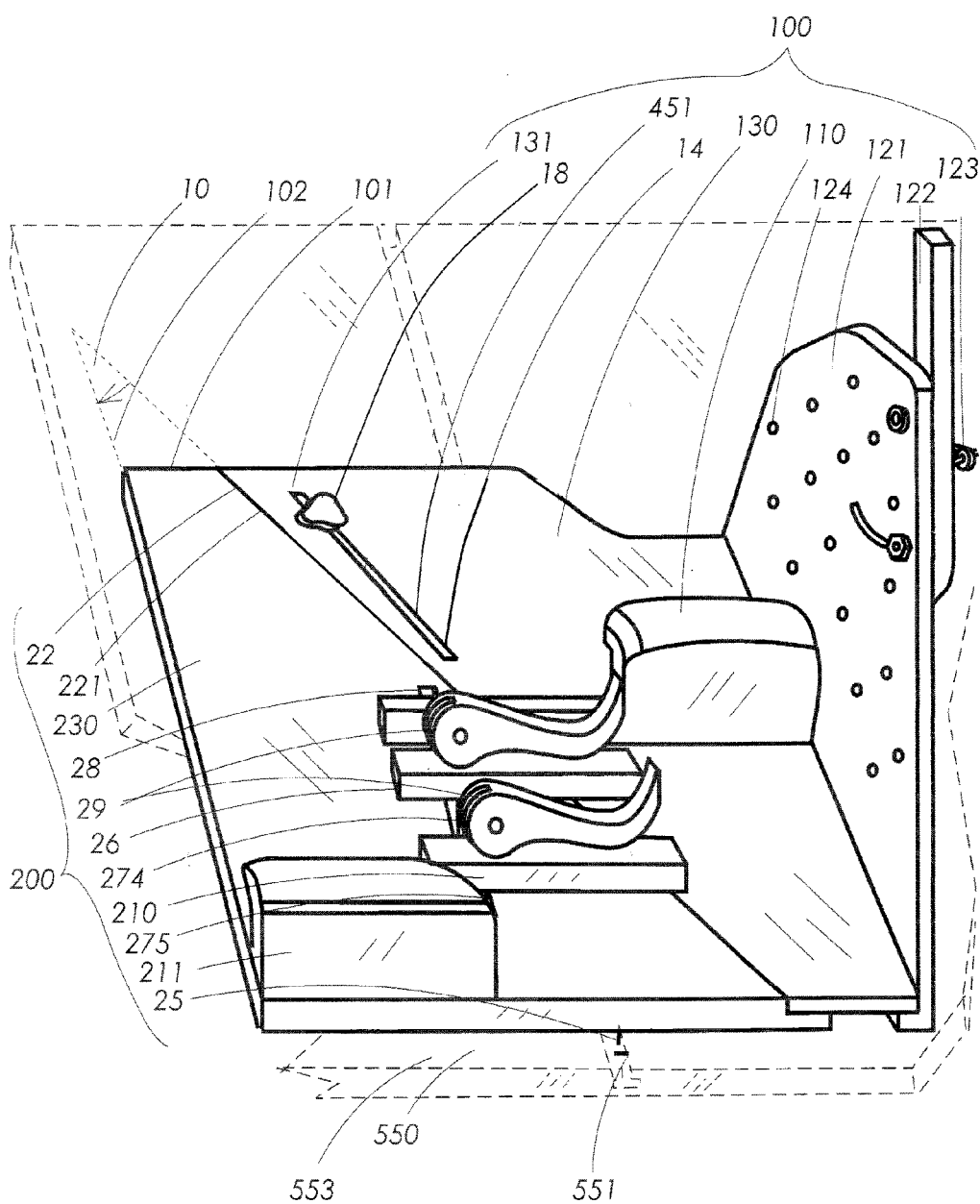

As one observes FIG. 31, it becomes immediately apparent that even though the functionality and workability of the subject matter originally considered are still present, the constituents thereof are changed. A relationship between the parts of the subject matter hereof is shown for a clearer understanding in FIGS. 32-36. In this continuation, the upper surface of the plates (130, 230, respectively) of the moveable component (100) and the fixed component (200), ante, share the same plane and, although other acceptable provisions have been made for lateral displacement of the jig upon the equipment mount—(553}—a generic term formerly designated the saw table (550) which is now merely exemplary—the former over-all component (3) for lateral spacing is absent.

As mentioned, the redesigned subject matter hereof comprises moveable component (100) and a fixed component (200) disposed adjacent one another (100, 200), separated by an angularly disposed boundary comprising for the fixed component (200) angle determinant means (22) specifically comprising an angled abutment ridge (221) and for the moveable component (100), a running abutment edge (131). These two contiguous elements (221, 131) comprised respectively by the plates (130, 230, respectively) of the two components (100, 200) obviate the inclusion of a separate structure present on the underlying previous arrangement.

The fixed component (200) comprises an indexing curb (210), that disposed nearest the operator, and an object spacing curb (26). The two curbs (26, 210) are moveable along a longitudinally disposed translation channel (28) within which they are retained by translation fingers (275, 274, respectively). The curbs (26, 210) may be secured, or locked down, by clamp means 29, each shown specifically as a pull-up cam clamp (29) in FIG. 18. The fixed component (200) further comprises a longitudinal translation rail (25)—often colloquially referred to as a miter rail-disposed upon its underside in a manner explained in greater detail ante, an underlying adjustment shelf (231) and a left handhold (211).

The moveable component comprises a moveable curb preferably configured to provide a right handhold (110) disposed approximately midway along its longitudinal aspect. It further comprises the familiar guide fence (121), clamp means (451) to secure the two main components (100, 200) in place, a moveable component to fixed component translation slot (14) and a stabilizing abutment stop (122).

Figure 37:
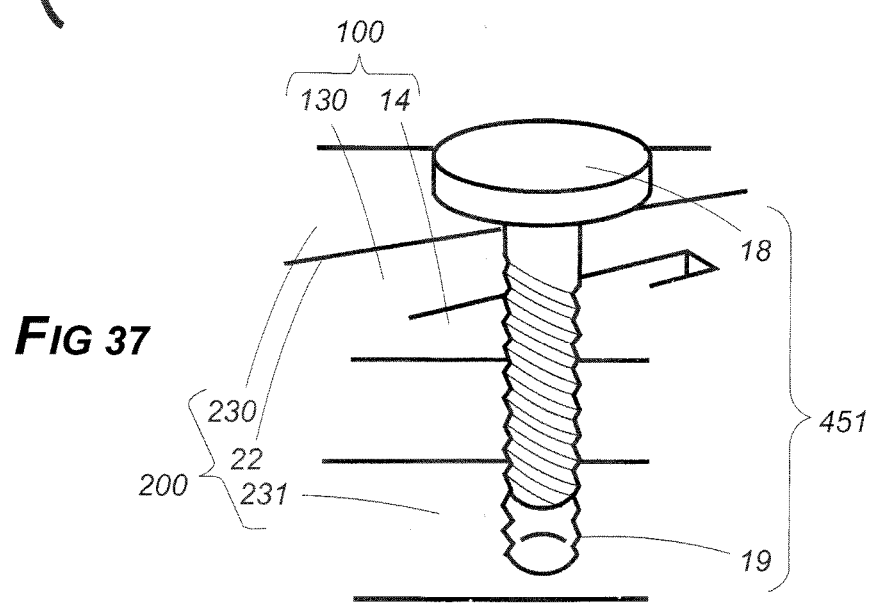
Figure 38:
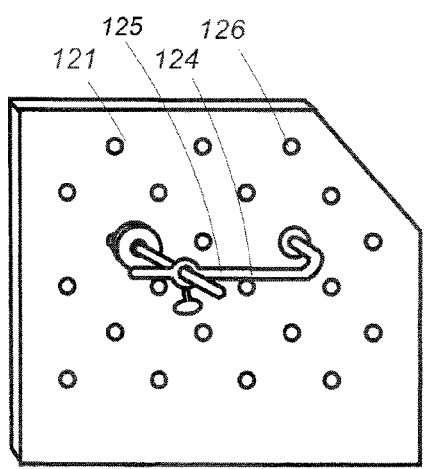
Figure 39:
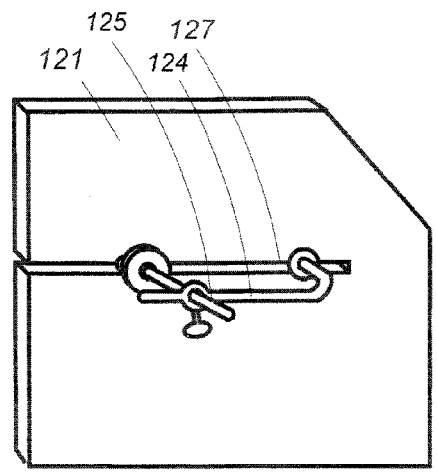

The guide fence (121) in turn comprises clamp means (125) to secure the workable piece (500) or workable object (580) in place for cutting or other work, respectively. Two specific versions of such clamp means (125) are shown in FIGS. 38 and 39. That in FIG. 38 comprises an aperture anchored stabilizing clamp (124). FIG. 39 illustrates a slot anchored stabilizing clamp (125). The clamp means (referenced generally as 451) securing the main components (100, 200) in place may be specifically featured as a clamp knob and threaded shank (18) for disposition into a clamp well (19), further illustrated in FIG. 37. With reference to the subject of clamps, it is often a simple matter to affix clamp means of one sort or another to the body of the apparatus employed in the work. Such is not always the case, however. Where a drill press (554) comprises what is herein designated the equipment mount (553), ante, it may be simpler merely to attach a separate shop clamp to secure the work.

Figure 36:
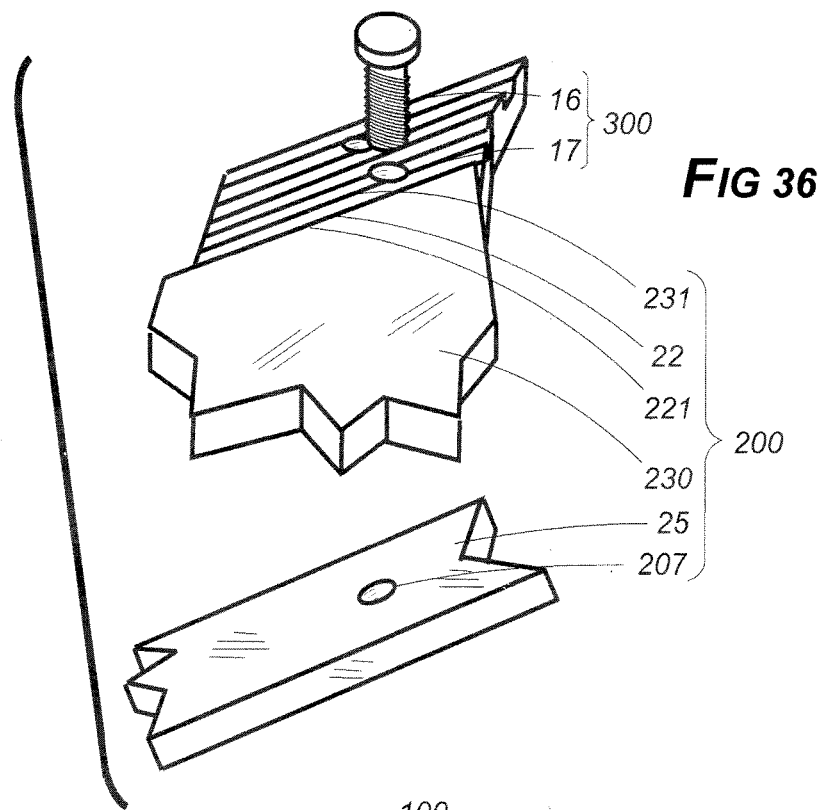

Despite the absence of what was formerly designated the displacement accommodating component, certain versions of the subject matter hereof nonetheless comprise lateral displacement accommodating means (300) specifically identified in FIG. 36 as alternative apertures (17) with attachment means (16) therefor to the fixed component's longitudinal translation rail (25). The attachment means (16) attaches to or within an aperture disposed in the rail (25). Thus, in those versions, one alternative position is provided to permit lateral repositioning of the rail (25) for what experience dictates is an acceptable degree lateral displacement of the jig upon the equipment table (550). Moreover, familiarity with curb (110, 210) adjustment, ante, permits some additional lateral displacement.

Figure 40:
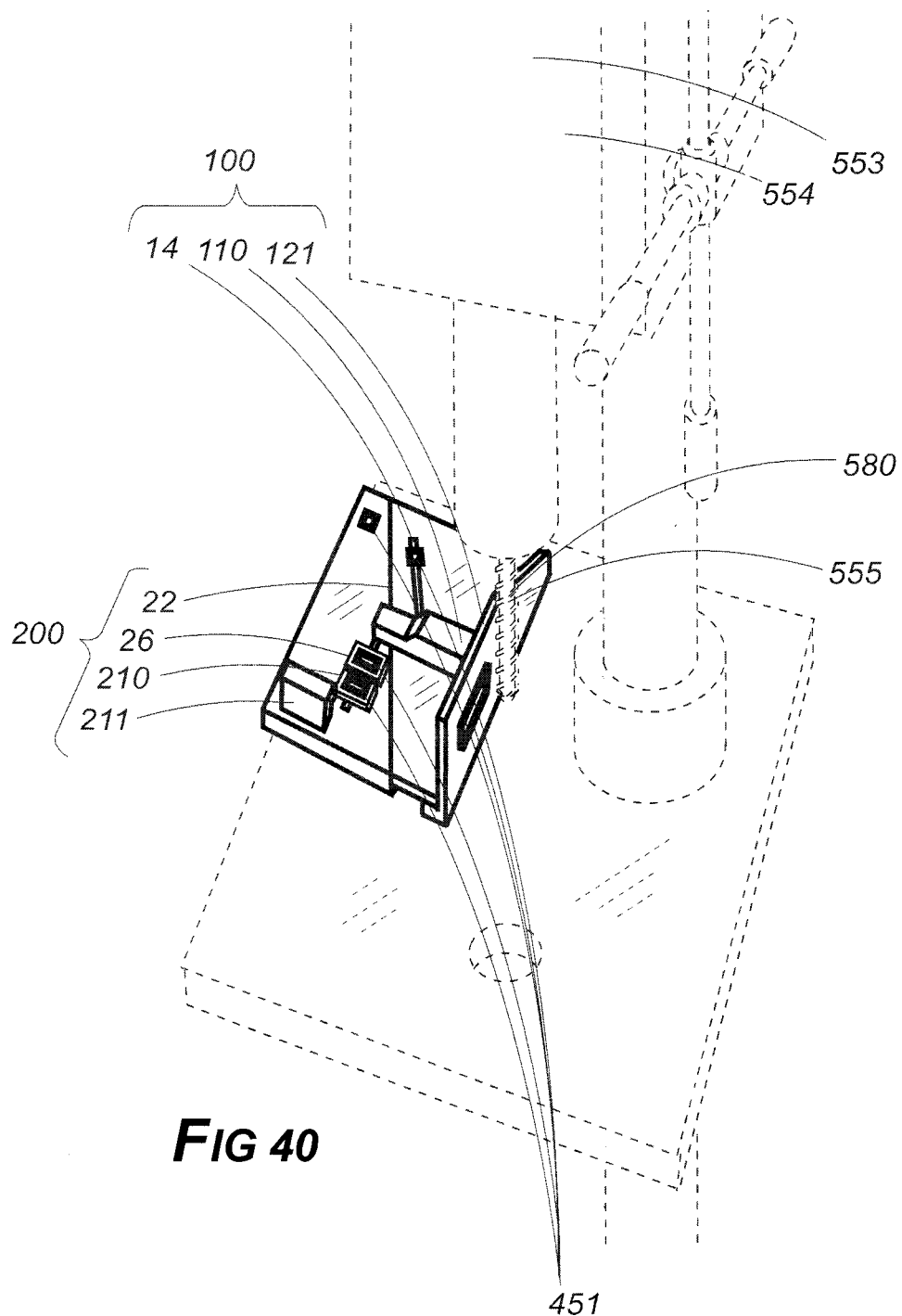
Figure 41:
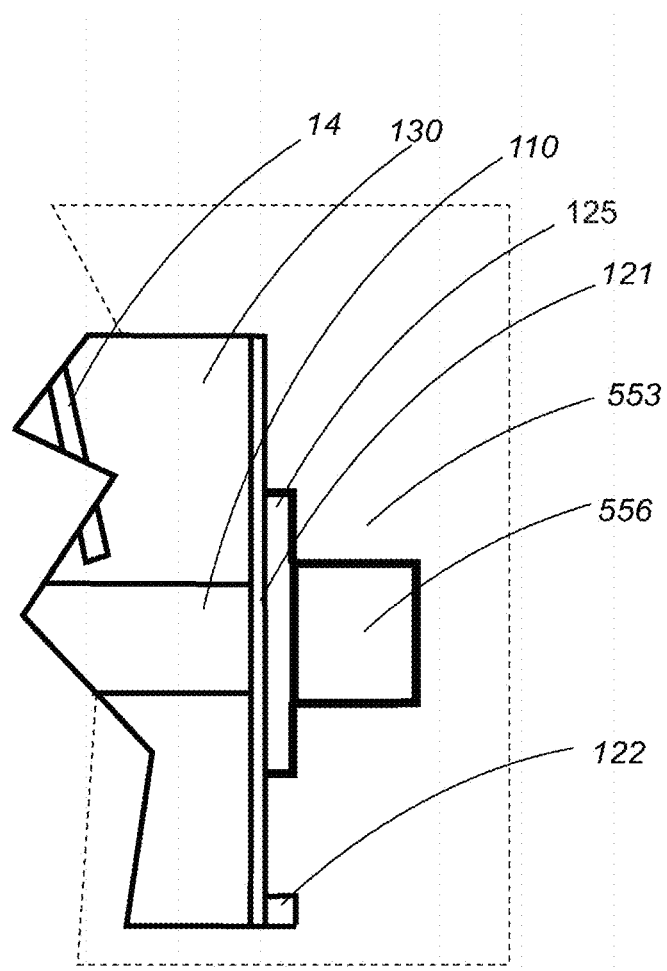

The universality of the jig is shown in FIG. 41 wherein heavily outlined box generically designates the workable object (556)—that is, the object upon which the centerline is sought, whether a workable piece (500) upon which a tenon (503) might be carved or any other thing requiring a centerline. As a matter of nomenclature, it should be noted that FIG. 41 also identifies the equipment or machine upon which the jig is placed to accomplish its task at what is designated the equipment mount (553). In FIG. 31, the equipment mount (553) comprises a saw table (550). In FIG. 40, a drill press (554). It should, therefore, be clear that the subject matter hereof may be employed in determining the centerline of any object and the operation required to accomplish that task may be undertaken upon any industrial or workshop apparatus.

Although no attempt is being made to cast the merits of the subject matter hereof into a method or process protocol, there are a number of steps which should be understood in its use. At the outset, the guide fence (121) must be moved to contact the task operating instrument (580) of the equipment mount (553), be it the saw blade (552) of a saw table (550), the drill bit (555) of a drill press (554) or other pertinent device. This undertaking provides what is generally recognized as a "zero" reference point—that is, a "zeroing" of the instrument. This is accomplished by advancing or withdrawing the curbs (26, 110, 210) to appropriate settings and moving the entire assembly against the task operating instrument (580). Specifically, as the effort to provide the desired spacing is pursued with the resultant of what is identified supra as the lateral displacement adjusting factor (104), the moveable curb and right handhold (110) are advanced—that is, away from the operator—until the guide fence (121) is zeroed as explained supra. The object spacing curb (26) and the indexing curb (210) are the also advanced to lie against the moveable curb to complete the zeroing process. Now, it becomes a simple matter to insert the workable object (556) between the object spacing curb (26) and moveable curb (110) and the object or its equivalent—be it, for example, mortise width or drill bit diameter—between the object spacing curb (26) and indexing curb (210). This procedure will entail retracting those two curbs (26, 210)—that is, moving them nearer the operator or backing them off a distance which may properly be considered the longitudinal displacement adjusting factor (103). As that retraction occurs, the moveable component (100) of which those curbs (26, 210) are an attached member also is moved longitudinally toward the operator the same distance so that by reason of the angle determinant means (22), the portion of the triangularly shaped moveable component (100) spacing the guide fence (121) from the task operating instrument (580) of the equipment mount (553}—be it (580) saw blade (552), drill bit (555) or other—a greater lateral distance. That greater distance—the lateral displacement adjusting factor (104)—as we have seen, equals exactly one-half the longitudinal displacement adjusting factor (103). This undertaking positions the working instrument—saw blade (552), or other—to encounter the centerline (501) of the workable object (556).

A subtlety may be involved in the performance of the foregoing steps. In zeroing the jig, the guide fence (121) is brought against the left edge of the task operating instrument (580). Where that instrument (580) comprises a drill bit (555), a tool of relatively substantial width, the allowance of additional space to accommodate it (555) is required. This is a different consideration than that involved with the cutting of a tenon (503), supra. Because of the manner in which the workable piece (500) was positioned for the tenon (503)

operation, the saw blade (552) made its cut at which might be the safe or non-invasive portion of the piece (500) so that the saw blade's (552) thickness was not for that task a matter of consideration. One must carefully analyze what task is about to be accomplished. Where an operation will performed upon a centerline itself (501), one must pay heed to the thickness of the task operating instrument (580). Here, the zeroing operation results in placement of the guide fence against the left edge of the task operating instrument (580)—the drill bit (554), for example. Allowance only for the width of the workable object (556) would indicate not a centerline (501) but a false line which fails to allow for the width of the operating instrument (580), the drill bit (555) or other tool used to perform the work. In such case, the indexing curb (210) must be longitudinally withdrawn—moved toward the operator—an additional distance equal to the bit's (555) width. The same would be true if the instrument (580) comprises a saw blade (552) wherein the task required cutting exactly upon a centerline (501)—an operation not appropriate for tenon (503) preparation because of the saw blade's (552) invasion otherwise of the tenon's (503) shoulder. So, to undertake the procedure properly after zeroing has been performed, the operator must retract, or back off, the indexing curb (210) longitudinally a distance equal to the width of the task operating instrument (580), the drill bit (555) for example, clamp the indexing curb (210) in place, move the object spacing curb (26) against it (210) and then insert the workable piece (500) for longitudinal spacing from what may be considered a newly zeroed position. Now, the lateral displacement adjusting factor (104) includes a distance allowing for the width of the task operating instrument (580)—the drill bit (555) or other—to permit operation exactly upon the centerline (501).

Although other modifications and changes may be suggested by those skilled in the art, it is the intention of the inventors to embody within the patent warranted hereon all changes and modifications as reasonably and properly come within the scope of their contribution to the art.

The inventor hereby claims:

1. A trigonometric universal centering jig for use on a power cutting tool having a work table, the trigonometric universal centering jig comprising:
    a first component including:
        a first plate having an upper surface and an underside, the first plate having a first edge and a second edge at an angle to the first edge;
        a guide fence extending along the first edge of the first plate;
        a movable curb extending from the plate, the movable curb extending from the second edge of the first plate;
    a second component including:
        a second plate having an upper surface and an underside, the second plate having an angled first edge disposed in abutted contact with the angled second edge of the first plate;
    a sliding connector connected between the first plate and the second plate to maintain the angled first edge of the second plate in abutted contact with the angled second edge of the first plate, the sliding connector permitting sliding movement of the first plate relative to the second plate along the abutted angled edges of the first and second plates;
    a clamp mounted to selectively secure the first and second plates in position relative to one another, the clamp being operable between a clamped state that prevents sliding movement of the first and second plates along the abutted angled edges and an unclamped state that permits sliding movement of the first and second plates along the abutted angled edges;
    first and second translation fingers mounted at the second plate, the first and second translation fingers being selectively positionable on the second plate and being selectively fastable in position;
    a translation rail extending from the underside of at least one of the first and second components; and
    wherein the movable curb of the first component extends onto the second plate for selective contact with at least one of the first and second translation fingers.

2. A trigonometric universal centering jig as claimed in claim 1, further comprising:
    a handle on at least one of the first and second components.

3. A trigonometric universal centering jig as claimed in claim 1, further comprising:
    a first handle extending from the first component, the first handle being formed unitarily with the movable curb; and
    a second handle extending from the second component.

4. A trigonometric universal centering jig as claimed in claim 1, further comprising:
    first and second toggle clamps mounted on respective ones of the first and second translation fingers, the first and second toggle clamps being operable between a position permitting sliding movement of the respective first and second translation fingers between a plurality of positions on the second plate and a position securing the respective translation finger in one of the plurality of positions on the second plate.

\* \* \* \* \*